(12) United States Patent
Crowe

(10) Patent No.: US 9,742,140 B2
(45) Date of Patent: Aug. 22, 2017

(54) CONNECTOR ASSEMBLY FOR A PLASMA ARC TORCH

(71) Applicant: Thermacut, s.r.o., Uherske Hradiste (CZ)

(72) Inventor: George Arthur Crowe, Claremont, NH (US)

(73) Assignee: THERMACUT, K.S., Uherske Hradiste (CZ)

( * ) Notice: Subject to any disclaimer, the term of this patent is extended or adjusted under 35 U.S.C. 154(b) by 0 days.

(21) Appl. No.: 15/086,822

(22) Filed: Mar. 31, 2016

(65) Prior Publication Data

US 2017/0187158 A1    Jun. 29, 2017

Related U.S. Application Data

(60) Provisional application No. 62/387,292, filed on Dec. 23, 2015.

(51) Int. Cl.
| | | |
|---|---|---|
| *B23K 10/00* | (2006.01) | |
| *H01R 43/26* | (2006.01) | |
| *H05H 1/34* | (2006.01) | |
| *H01R 13/00* | (2006.01) | |
| *H01R 13/627* | (2006.01) | |
| *H01R 13/629* | (2006.01) | |

(52) U.S. Cl.
CPC ........... *H01R 43/26* (2013.01); *H01R 13/005* (2013.01); *H01R 13/6272* (2013.01); *H01R 13/62955* (2013.01); *H05H 1/34* (2013.01)

(58) Field of Classification Search
CPC .. H01R 43/26; H01R 13/005; H01R 13/6272; H01R 13/62955; H05H 1/34; H05H 1/36
USPC ............ 219/121.39, 121.45, 121.48, 121.54
See application file for complete search history.

(56) References Cited

U.S. PATENT DOCUMENTS

| | | | | |
|---|---|---|---|---|
| 7,176,404 | B2 * | 2/2007 | Herres ................... | B23K 9/323 219/121.48 |
| 7,410,377 | B2 * | 8/2008 | Wharton .............. | H01R 13/633 439/172 |
| 7,762,830 | B2 * | 7/2010 | Roberts .................. | B23K 9/324 439/350 |
| 8,585,424 | B2 * | 11/2013 | Montena .............. | H01R 13/622 439/320 |

(Continued)

FOREIGN PATENT DOCUMENTS

WO         2009105511  A2      8/2009

*Primary Examiner* — Mark Paschall
(74) *Attorney, Agent, or Firm* — Warner Norcoss and Judd LLP

(57) ABSTRACT

A connector assembly for coupling a plasma arc torch or a welding torch to a power supply having a receiving mechanism. The connector assembly includes a connector body, a plug, and a locking key assembly. The connector body has distal and proximal ends, and the plasma arc torch is affixed to the distal end. The plug extends from the proximal end of the connector body and may include a keyseat. The locking key assembly includes an adapter key and a latch. The adapter key is disposed within the plug keyseat and is configured for receipt within a keyway of the receiving mechanism. The latch retains the locking key assembly to the connector body or connector assembly. The locking key assembly releasably couples the connector assembly to the receiving mechanism and the plasma arc torch to the power supply.

20 Claims, 25 Drawing Sheets

(56) References Cited

U.S. PATENT DOCUMENTS

| | | | |
|---|---|---|---|
| 2003/0092318 A1* | 5/2003 | Conway | H05H 1/34 439/595 |
| 2003/0160032 A1* | 8/2003 | Mackenzie | H05H 1/34 219/121.51 |
| 2010/0264120 A1* | 10/2010 | Reinke | H05H 1/34 219/121.5 |
| 2011/0306226 A1* | 12/2011 | Montena | H01R 9/0524 439/345 |

* cited by examiner

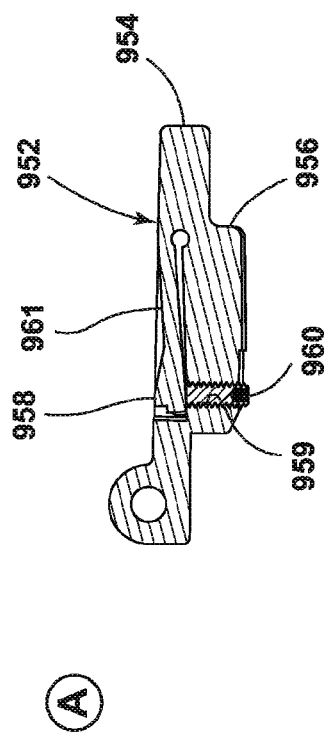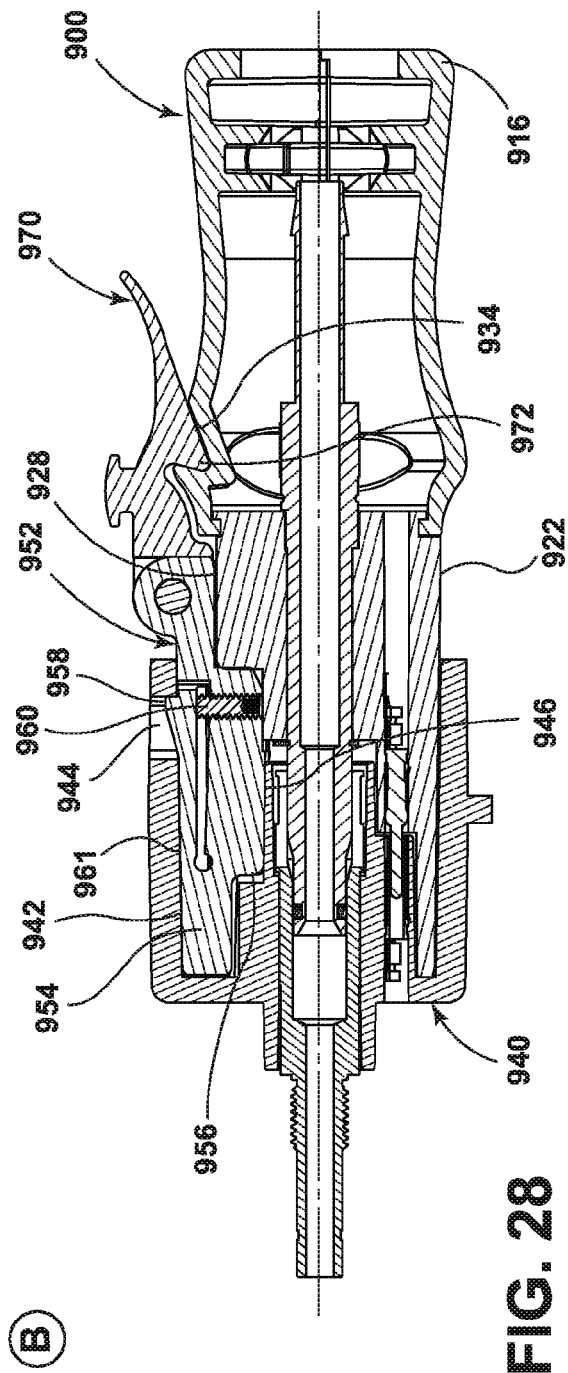
FIG. 27
FIG. 28

CONNECTOR ASSEMBLY FOR A PLASMA ARC TORCH

FIELD OF THE INVENTION

The present invention relates generally to coupling a plasma arc or welding torch to a power supply, and more particularly to a connector assembly including an adapter key for coupling a plasma arc or welding torch to a power supply.

BACKGROUND OF THE INVENTION

Plasma arc and welding arc torches are widely used for cutting and welding metallic materials. Plasma arc and welding equipment generally includes three main components: a torch assembly, a power supply, and leads that connect the torch assembly and power supply. In some systems, the torch and the power supply are connected within the power supply housing, which means the torch can only be changed by opening up the power supply housing. Other systems attach the torch to the power supply via a detachable connector located on the exterior of the power supply housing. The exterior attachment makes it easier to exchange or replace the torch in the event that the torch becomes damaged and requires repair, or the type of torch needs to be changed.

A plasma torch is commonly connected to a power supply through a torch connector assembly which generally includes a plug with a variety of electrical and fluid conductors passing therethrough. Similarly, the power supply includes a socket adapted to receive the plug, as well as a set of mating electrical and fluid conductors.

Existing designs for detachable connectors often use a threaded connection to couple the torch assembly to the power supply. However, threaded connections require two hands, are often difficult to properly align and engage the threads without cross-threading, and are time intensive. Further, proper alignment of the fluid and electrical conductors disposed within each side of the connection can be difficult. Other existing types of connections for attaching the torch to the power supply can be bulky, requiring a large access area, or weak and unreliable. As a result, connecting and disconnecting a torch assembly to and from a power supply is often cumbersome and difficult to do in the field.

SUMMARY OF THE INVENTION

The present invention provides a connector assembly for coupling a plasma arc torch or a welding torch to a standard power supply. The connector assembly generally provides an easy to align, reliable, and strong connection between the plasma arc torch and power supply. The connector assembly is easily replaceable in the event that either the torch or the power supply is damaged. Further, the connector assembly enables a variety of torches to be connected to an existing power supply by utilizing an adapter key. The adapter key couples the torch to a socket on the power supply, acting as a key or connector to join two female openings together. The adapter key also provides for the proper alignment of the torch connector assembly with the power supply socket, ensuring alignment of fluid and electrical conduits and pins disposed within each side of the connection.

In the disclosed embodiment, a connector assembly is used for coupling a plasma arc torch to a power supply that has a receiving mechanism. The connector assembly includes a connector body, a plug, and a locking key assembly. The connector body has a distal end and a proximal end, and the distal end is configured to connect to the plasma arc torch. The plug extends from the proximal end of the connector body and includes a keyseat. The locking key assembly includes an adapter key and a latch. The adapter key is disposed within the plug keyseat and is configured for receipt within a keyway of the receiving mechanism. The latch releasably retains the locking key assembly to the connector body. Accordingly, the locking key assembly releasably couples the connector assembly to the receiving mechanism.

Additional embodiments of a connector assembly are also described herein. The connector assembly may include an adapter key in the form of: a screw lock key, a torsion spring key, a spring clip key, a block wedge key, a ball detent key, a cam key, a tapered wedge key, a cantilevered tab key, a cantilever screw key, and a cam screw key. Still other embodiments of a connector assembly may include a latch in the form of: a snap latch, a fixed latch, a flexible latch, a pivot latch, a lock pin latch, and a pivot hook latch. Different combinations of adapter keys and latches may be made to form the locking key assembly and connector assembly.

According to another embodiment, a method of connecting a plasma arc torch to a power supply is disclosed. The method includes providing a power supply, inserting a locking key assembly, providing a plasma arc torch, inserting the connector assembly, and releasably affixing the locking key assembly to a connector body. The power supply includes a socket disposed within or on the power supply; the socket has a keyway with a window formed therethrough. The locking key assembly includes a tab and a latch, and the tab is biased into engagement within the socket keyway window. The locking key assembly is inserted into the socket keyway. The plasma arc torch includes a connector assembly that has a connector body and a plug with a keyseat. The connector assembly is inserted into the socket such that the locking key assembly is received within the plug keyseat. The locking key assembly latch includes a retention feature and the connector body includes a complementary receiving feature. Thus, the locking key assembly releasably couples the plasma arc torch to the power supply.

These and other features and advantages of the invention will be more fully understood and appreciated by reference to the entire application including the specification, the claims, and the drawings.

BRIEF DESCRIPTION OF THE DRAWINGS

FIG. 27 is a cross-sectional view of a cantilever screw key of a connector assembly according to another embodiment;

FIG. 28 is a cross-sectional view of the connector assembly key inserted into the socket and illustrating the constrained state of cantilever screw key;

DESCRIPTION OF THE CURRENT EMBODIMENT

Figure 1:
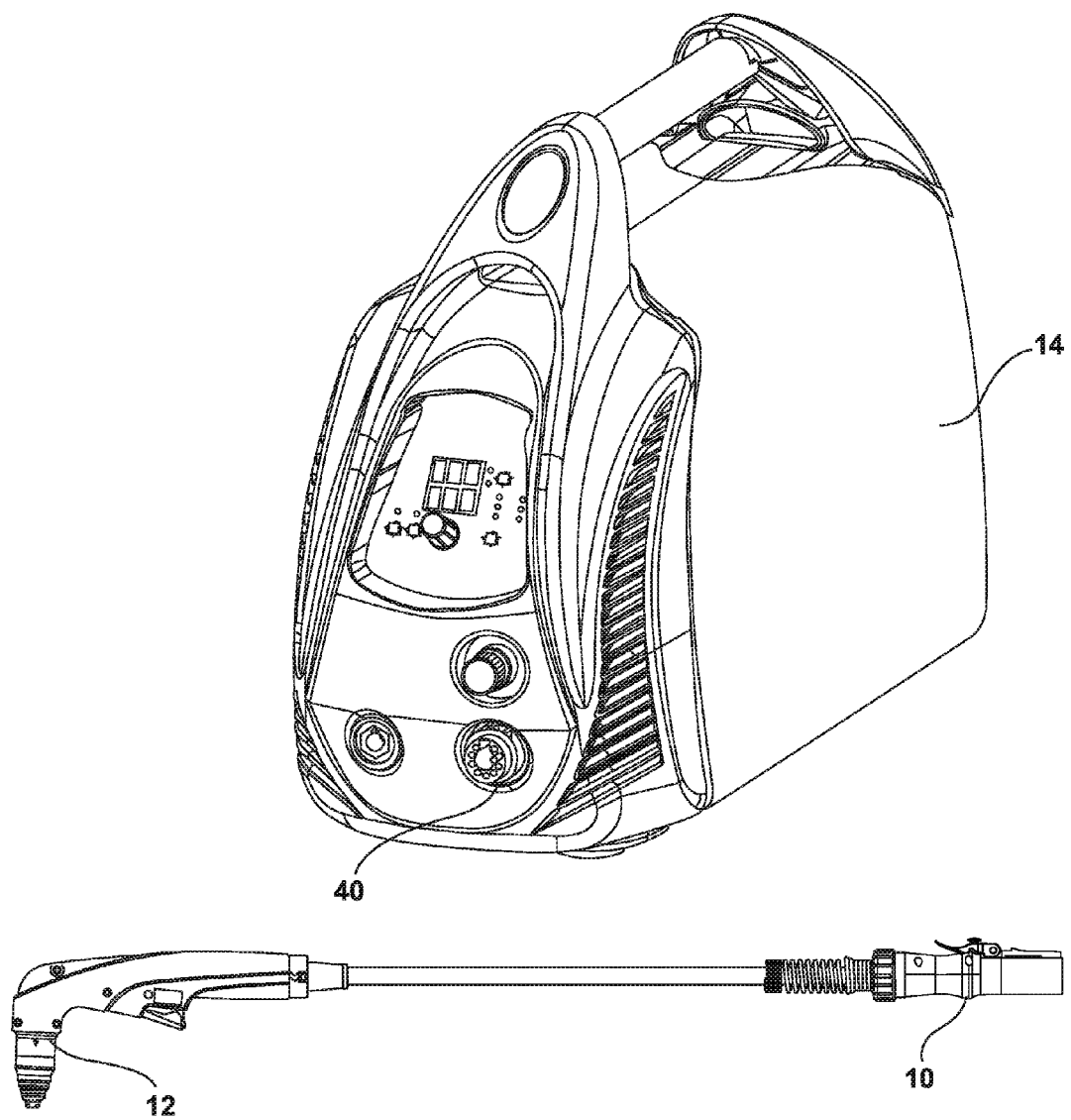
FIG. 1 is a perspective view of a connector assembly according to one embodiment of the present invention, the connector assembly is illustrated for use with an exemplary plasma arc torch and an exemplary power supply.

A connector assembly 10 for coupling a plasma arc torch 12 or a welding torch to a power supply 14 in accordance with an embodiment of the invention is illustrated in FIGS. 1-10. The connector assembly 10 provides an easy to align, reliable, and strong connection between the plasma arc torch 12 and power supply 14. The connector assembly is easily replaceable in the event that either the torch 12 or the power supply 14 is damaged. Further, the connector assembly 10 enables a variety of torches to be connected to an existing power supply.

I. Structure

Referring now to FIGS. 1-10, the connector assembly 10 according to one embodiment of the invention includes a connector body 16 with a distal end 18 and a proximal end 20, and a plug 22 that extends from the proximal end 20. The distal end 18 of the connector body 16 is configured to mount or attach to the plasma arc torch 12 in a conventional manner. A plurality of conductors are disposed within the connector assembly 10, which may include but are not limited to, a gas carrying conduit 24 and at least one electrical pin 26, shown in FIG. 3. The gas carrying conduit 24 can carry gas and/or electrical current from the power supply 14 to the plasma arc torch 12; the electrical pins 26 electrically couple the power supply 14 and plasma arc torch 12. The gas carrying conduit 24 and electrical pins 26 mate with corresponding conduits and pins that are housed within the power supply 14.

The plug 22 is a generally cylindrical member but has a flat face 28 on the otherwise substantially circular outer surface. An elongated keyseat 30 is formed through the exterior wall on the flat face 28 and includes a bottom wall or lower base 32. A keyseat, as generally understood, is a slot or opening formed on a shaft or surface in which a key may be seated. The keyseat is formed with a depth such that less than the full height of a complementary key fits within the keyseat. Further, the plug 22 also includes a plurality of axially extending channels or holes through which the gas carrying conduit 24 and electrical pins 26 pass.

The connector body 16 is also a generally cylindrical member and includes a receiving feature on the exterior surface thereof, for example a tapered recess 34, adjacent the proximal end 20. As described above, the distal end 18 of the connector body 16 is mounted or attach to the plasma arc torch 12. The gas carrying conduit 24 and electrical pins 26 pass through the substantially hollow connector body 16, and in the illustrated example the connector body is shown split into two halves.

The plug 22 is sized for receipt within a receiving mechanism or socket 40 positioned on or within the power supply 14. The socket 40 is conventional and includes a keyway 42 that has a window 44 formed therein. A keyway, as generally understood, is a groove or notch formed in a shaft or surface which covers the portion of the key that projects from the keyseat in which it is disposed. The socket 40 also has a central channel 46 through which the power supply's gas carrying conduit 24 may pass. Further, the exterior wall of the socket 40, the keyway 42, and the central channel 46 define a void 48 within the socket 40.

The connector assembly 10 includes a locking key assembly 50 which has an adapter key 52 and a latch 70. Perhaps best shown in FIGS. 4 and 5, the adapter key 52 has an elongated body 54, a detent finger 56 positioned below the body 54, and a ramp or tab 58 positioned on the body 54 opposite the detent finger 56. The detent finger 56 is connected to the body 54 by an integrally formed living hinge 60 which enables the detent finger 56 to be pivoted to a degree about the living hinge 60 between a free state A (see FIG. 6) and a constrained state B (see FIG. 7). Further, the adapter key 52 has a mounting bracket 62 with a pin hole 64 extending through the mounting bracket 62.

Figure 9:
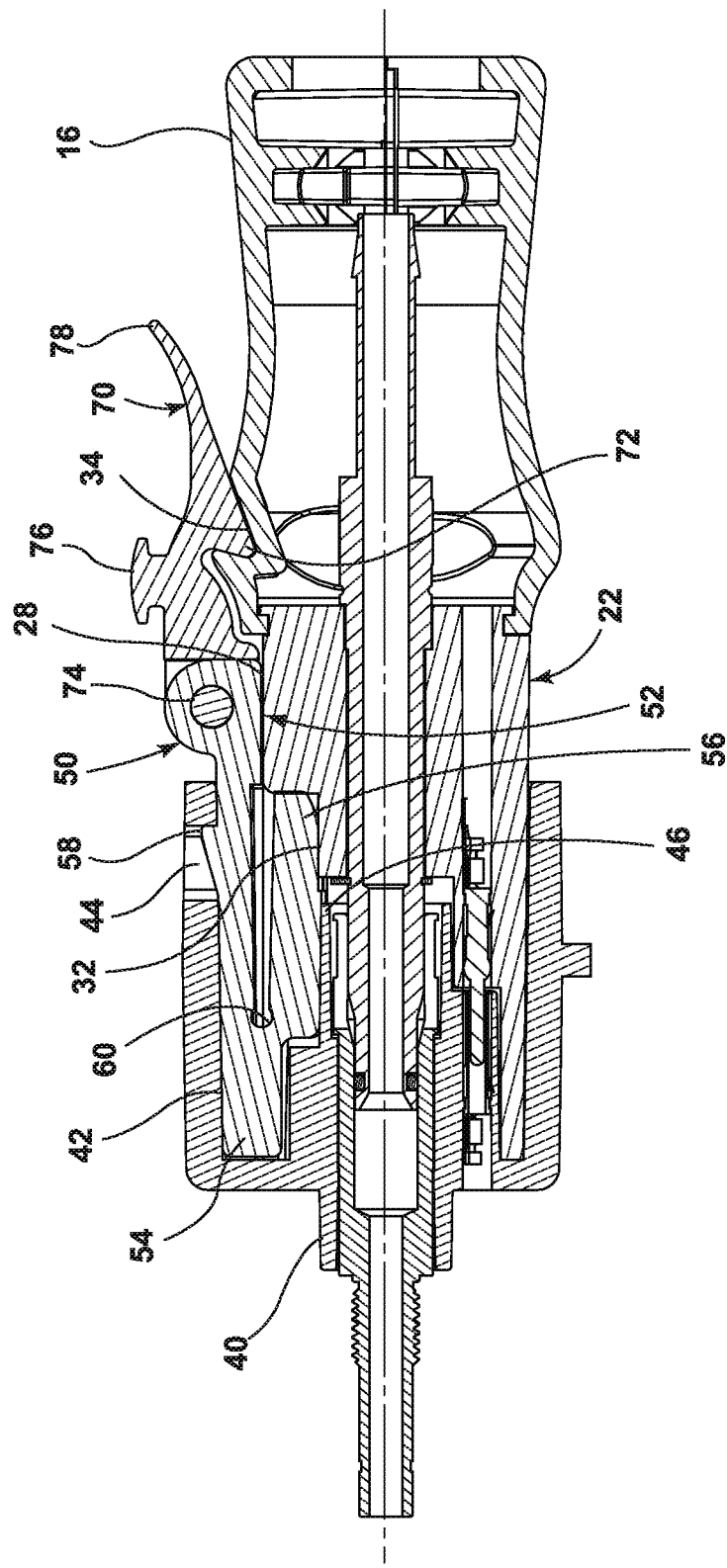
FIG. 9 is a cross-sectional view of the connector assembly inserted and secured within the socket.
Figure 10:
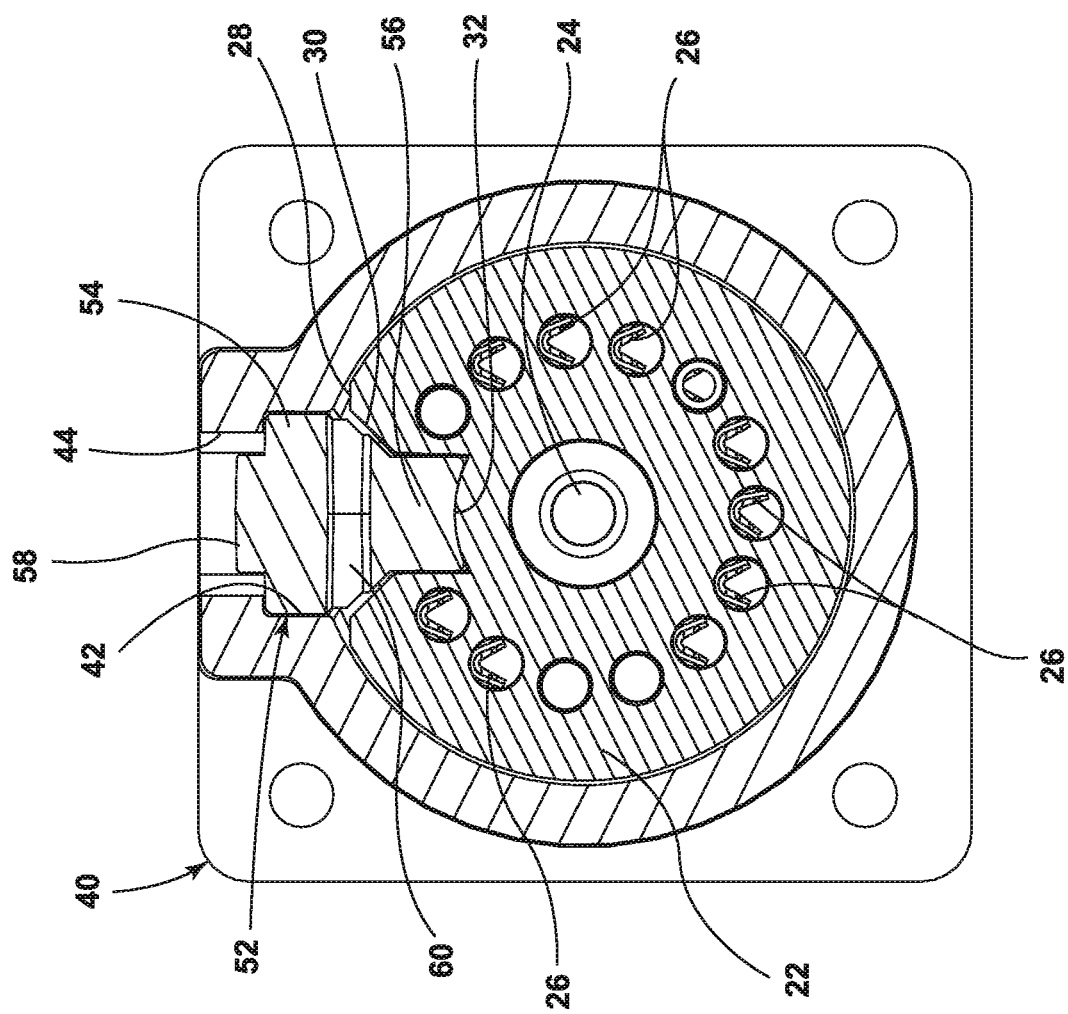
FIG. 10 is a cross-sectional view of the connector assembly and socket taken along line X-X of FIG. 2.

The latch 70 has a retention feature, for example a lip 72, to releasably retain the latch 70 to the complementary tapered recess 34 on the connector body 16. The latch 70 may be pivotally mounted to the mounting bracket 62 on the adapter key 52 using a hinge pin 74 or other similar pivot attachment. Accordingly, the latch 70 affixes the locking key assembly 50 to the connector body 16, as illustrated in FIG. 9. The described retention feature could be in the form of a lip, a snap, a pin, a screw, or any other suitable retention means, and the receiving feature on the connector body could be a feature that is complementary to the latch. Alternatively, the recess 34 could be disposed on the plug 22 such that the latch 70 retains the locking key assembly 50 to the plug 22.

The latch 70 may also include a button 76 and a release lever 78. The button 76 is positioned substantially above the lip 72 and can be pressed down, forcing the lip 72 into the connector body recess 34. This downward force, along with the sloped lip 72 and the tapered recess 34, cause the latch 70 to flex a small amount and the retention features to seat. The release lever 78 extends beyond the lip 72 and button 76 and functions as a release arm for the latch 70. To disengage the lip 72 from the recess 34, the release lever 78 is lifted upward, pulling the lip 72 out of engagement with the recess 34.

A portion of the adapter key 52 is received within the socket void 48 and keyway 42, thus the adapter key 52 is accordingly shaped to fit within this geometry. When the adapter key 52 is inserted into the socket 40, the central channel 46 deflects the detent finger 56 up about the living hinge 60, pivoting the detent finger 56 from the free state A, illustrated in FIG. 6, to the constrained state B, illustrated in FIG. 7. Further, the tab 58 is aligned and received within the window 44 in the keyway 42. In the constrained state B, the detent finger 56 biases the tab 58 into engagement within the window 44.

When the plug 22 is inserted into the socket 40, a portion of the adapter key 52 is received and seated within the plug keyseat 30. The base 32 of the plug 22 is positioned below a portion of the detent finger 56 of the adapter key 52, preventing the tab 58 from disengaging with the window 44. Likewise, the flat face 28 of the plug 22 is positioned below mounting bracket 62 of the adapter key 52, acting as a positive stop to limit downward movement (and potential disengagement of the tab 58 within the window 44) of the mounting bracket 62 end of the adapter key 52. When the plug 22 is installed in the socket 40, the described component arrangement prevents removing the locking key assembly 50 from the socket 40. In other words, when the torch 12 is connected to the power supply 14, the locking key assembly 50 cannot be removed from within the socket 40. The latch 50 is pivoted to engage the lip 72 within the recess 34 on the connector body 16, releasably retaining the locking key assembly 50 to the connector body 16.

Given this described configuration, the adapter key 52 provides mechanical connection between the keyseat 30 and keyway 42, and couples the plug 22 to the socket 40. In other words, the male-type adapter key 52 is used to join two female-type openings in mating components. Additionally, the gas carrying conduit 24 and electrical pins 26 of the connector body 16 mate with corresponding conduit and electrical pins of the power supply 14.

The locking key assembly 50, also functions as an alignment guide when connecting the plasma arc torch 12 to the power supply socket 40. Proper alignment of the connector assembly 10 to the socket 40 is needed so that the included gas carrying conduits 24 and electrical pins 26 reliably align and may be connected. The locking key assembly 50 aligns within the socket keyway 42, and the plug keyseat 30 in turn aligns with the locking key assembly 50, thereby providing radial alignment between the socket keyway 42 and plug keyseat 30, and thus the connector assembly 10 and socket 40.

II. Method

Figure 11:
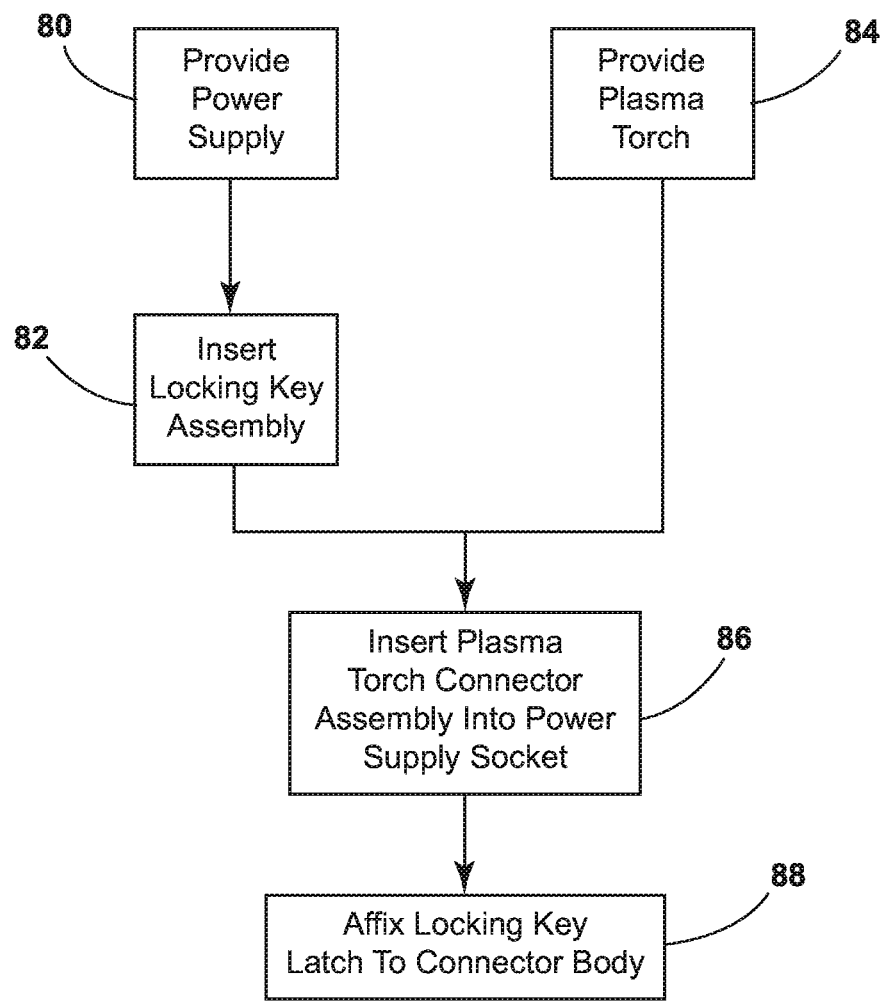
FIG. 11 is a flowchart for a method of connecting a plasma arc torch to a power supply according to another embodiment of the invention.

The above connector assembly is presented in greater detail in connection with the flow chart of FIG. 11. In particular, the flow chart of FIG. 11 includes a method of connecting a plasma arc torch to a power supply, the method including: (a) providing a power supply including a socket having a keyway with a window formed therethrough, (b) inserting a locking key assembly into the socket keyway, the locking key assembly including a latch, (c) providing a plasma arc torch including a connector assembly having a connector body and a plug with a keyseat, (d) inserting the connector assembly into the socket such that the locking key assembly is received within the plug keyseat, and (e) releasably affixing the locking key assembly latch to the connector body or plug, the locking key assembly releasably couples the plasma arc torch to the power supply.

Figure 2:
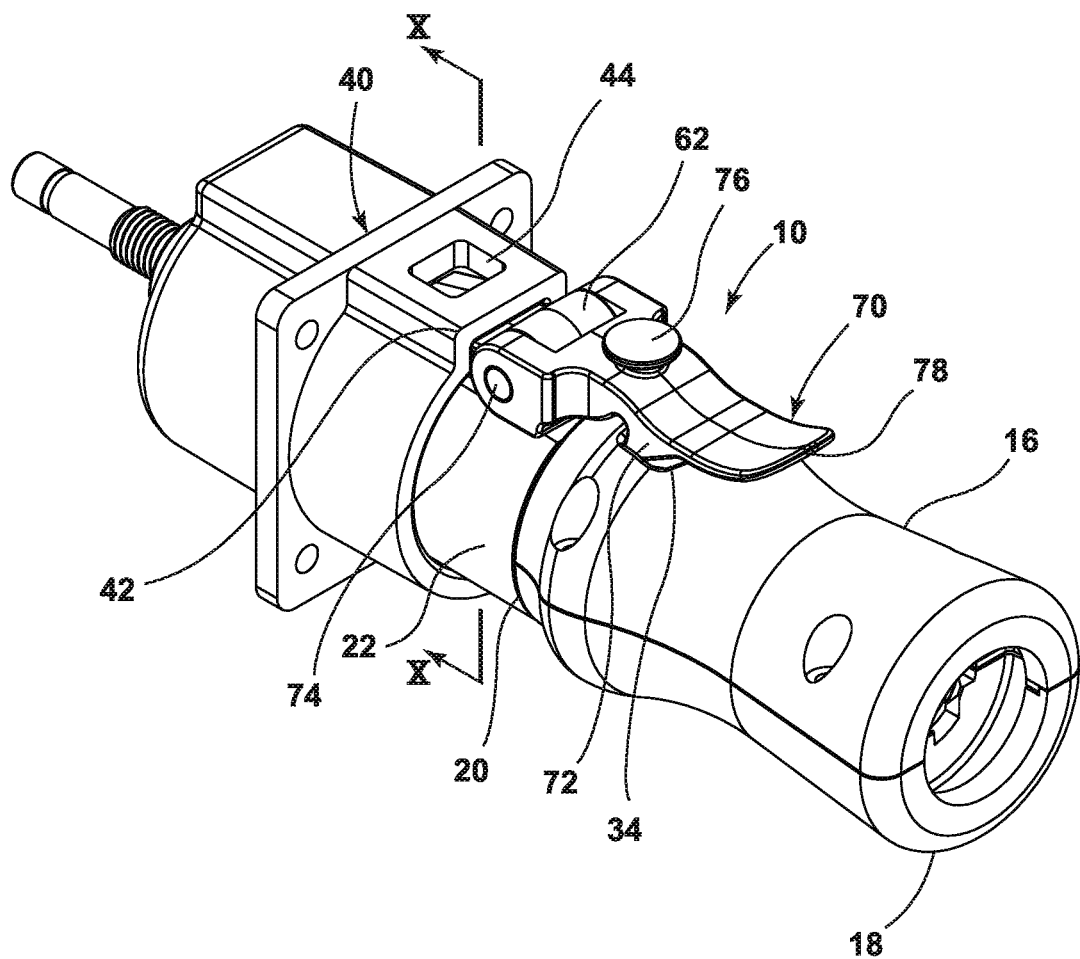
FIG. 2 is a perspective view of the connector assembly mounted to a socket of the power supply.
Figure 3:
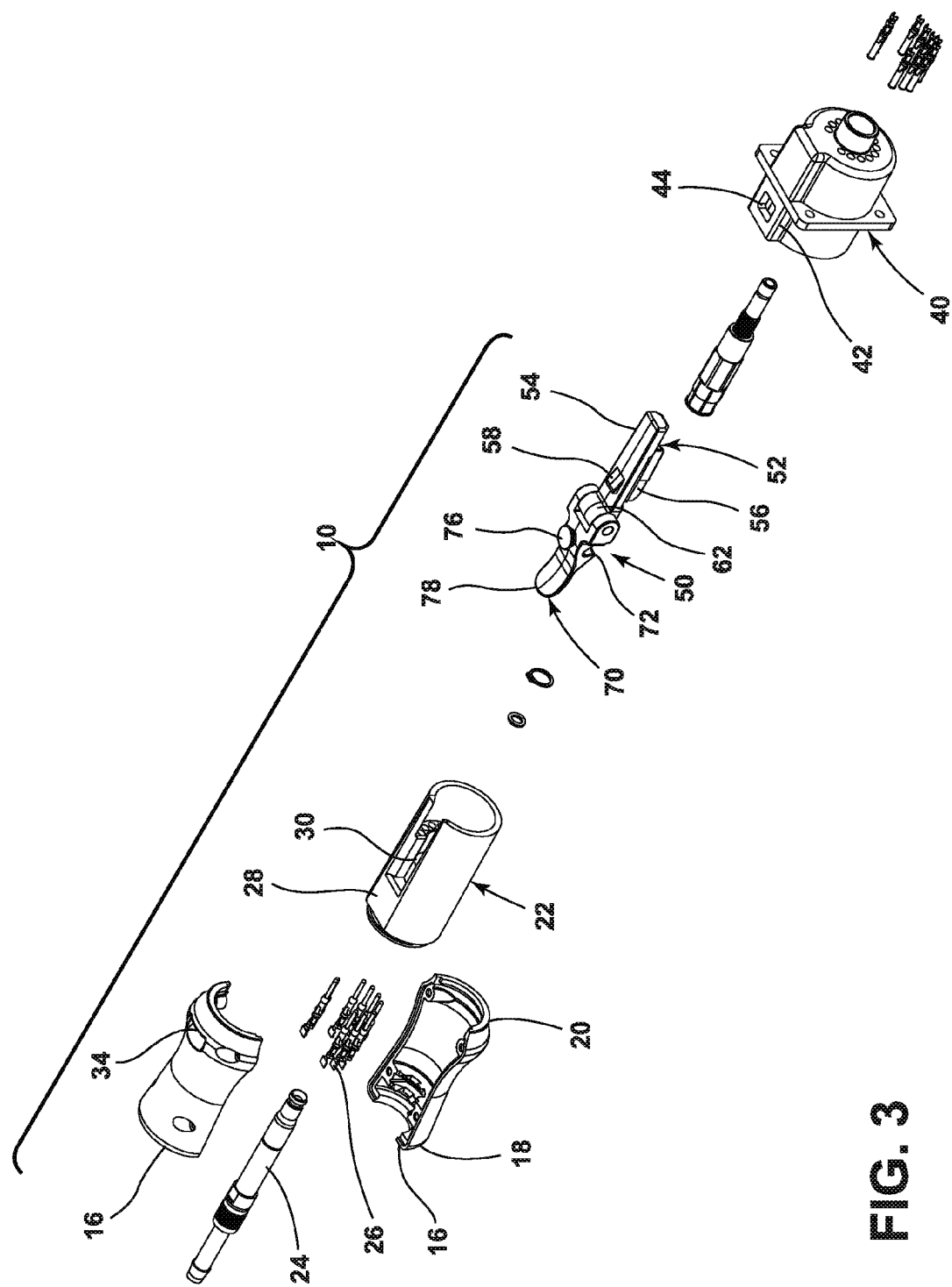
FIG. 3 is an exploded view of the connector assembly and socket.
Figure 4:
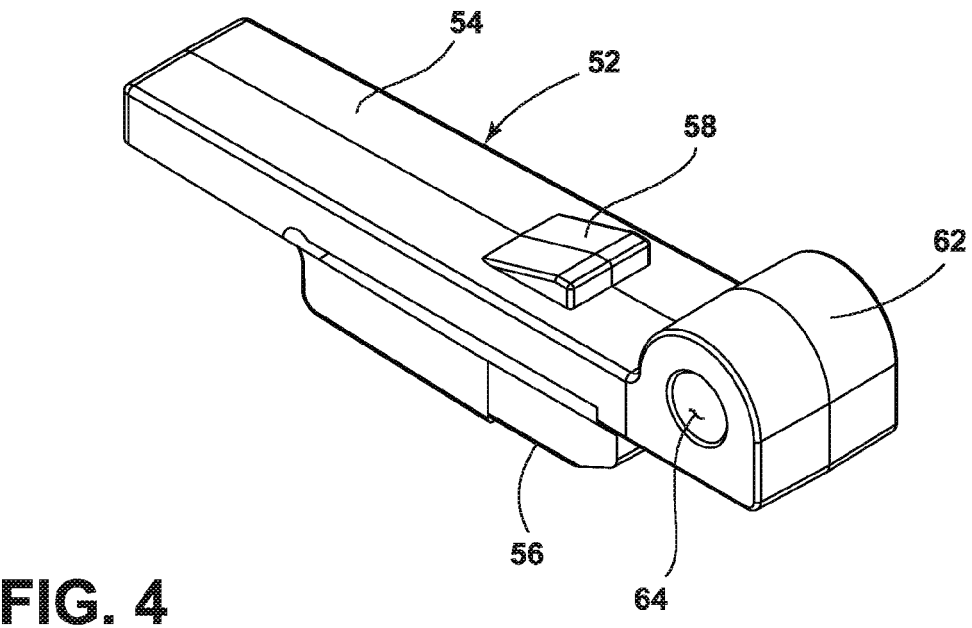
FIG. 4 is a perspective view of an adapter key of the connector assembly.
Figure 5:
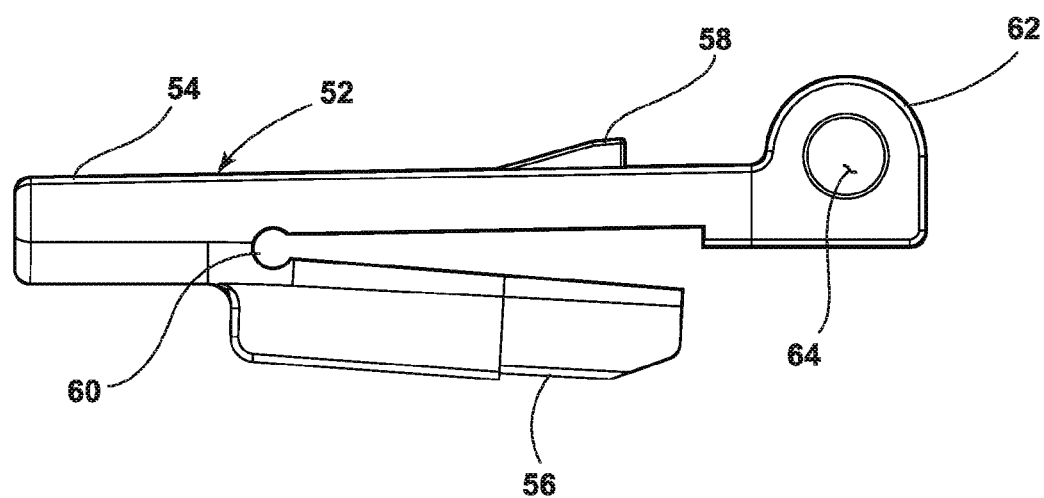
FIG. 5 is a side view of the adapter key.

Providing a power supply including a socket having a keyway with a window formed therethrough is depicted as step 80 in FIG. 11. As shown in FIGS. 1-2, and as described above, the socket 40 is disposed within or on the power supply 14. In addition to mating with the locking key assembly tab 58, the keyway 42 provides an alignment feature to help align the mating connectors within the socket 40 and connector assembly 10.

Figure 6:
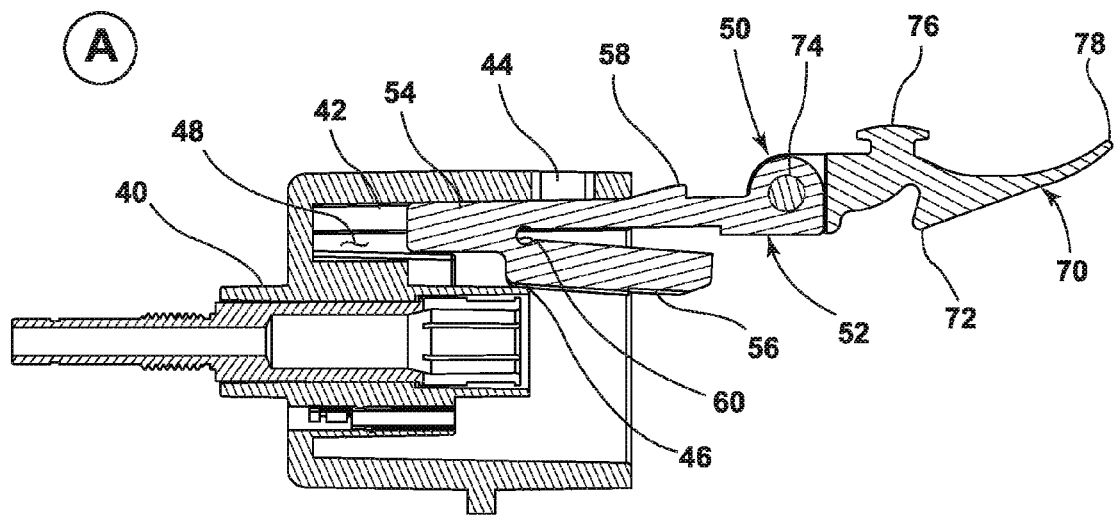
FIG. 6 is a cross-sectional view of a locking key assembly of the connector assembly, illustrating inserting the locking key assembly into the socket and the free state of the adapter key.
Figure 7:
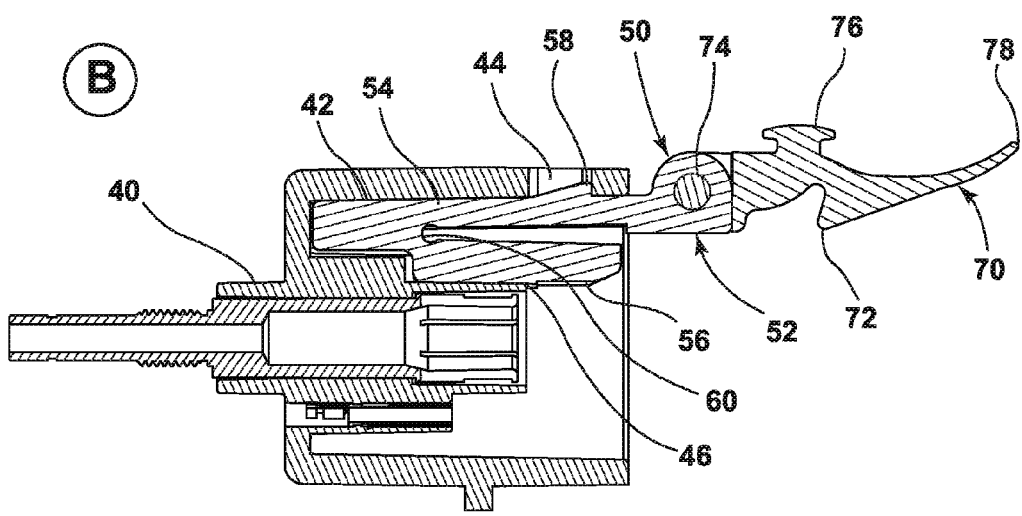
FIG. 7 is a cross-sectional view of the locking key assembly inserted into the socket and illustrating the constrained state of the adapter key.
Figure 8:
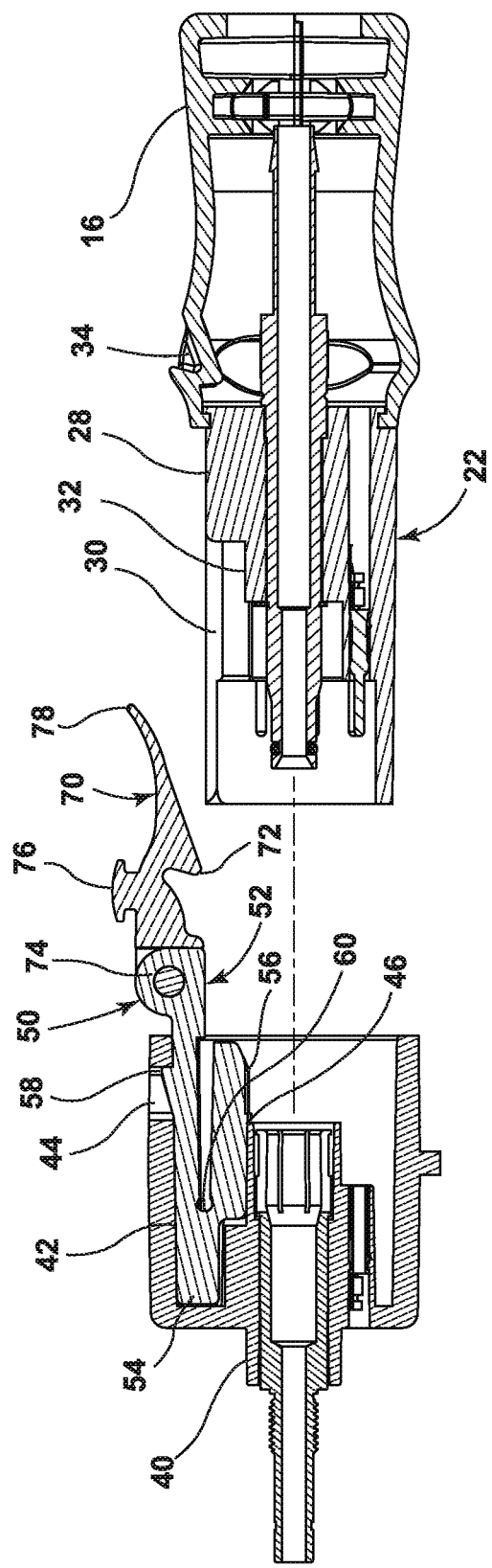
FIG. 8 is a cross-sectional view of the connector assembly and socket, prior to inserting a plug of the connector assembly into the socket.

Inserting a locking key assembly into the socket keyway, the locking key assembly including a latch is depicted as step 82 in FIG. 11. As shown in FIGS. 6-8, and as described above, the locking key assembly is inserted into the socket 40; a portion of the adapter key 52 is received within a socket void 48 and the keyway 42. When the adapter key 52 is inserted into the socket 40, the central channel 46 causes the detent finger 56 to pivot up about the living hinge 60, moving the detent finger 56 from the free state A to the constrained state B. Further, the locking key assembly 50 tab 58 is biased into engagement within the keyway window 44 when the locking key assembly 50 is inserted into the socket 40.

Providing a plasma arc torch including a connector assembly having a connector body and a plug with a keyseat is depicted as step 84 in FIG. 11. The connector assembly 10 is mounted to a plasma arc torch, and a plug 22 extends from the free end of the connector assembly 10. The plug 22 is configured to be matingly received within the socket 40.

Inserting the connector assembly into the socket such that the locking key assembly is received within the plug keyseat is depicted as step 86 in FIG. 11. The locking key assembly 50 is already positioned within the socket 40, and more specifically within the keyway 42. To properly insert the connector assembly 10 within the socket 40, the plug keyseat 30 should be aligned with the locking key assembly 50, and then plug 22 and connector assembly 10 can be pushed into the socket 40. The locking key assembly 50, particularly the adapter key 52 is received within the plug keyseat 30 when the connector assembly 10 is inserted into the socket 40, as shown in FIG. 9. With the plug 22 inserted into the socket 40, the flat face 28 is positioned below a portion of the key 52, restraining the tab 58 within the window 44.

Releasably affixing the locking key assembly latch to the connector body, the locking key assembly releasably coupling the plasma arc torch to the power supply is depicted as step 88 in FIG. 11. The latch 50 is pivoted to engage a lip 72 within a recess 34 on the connector body 16, releasably retaining the locking key assembly 50 to the connector body 16. More specifically, the button 76 may be pressed down, pressing the sloped lip 72 into the tapered connector body recess 34.

Disengaging or removing the connector assembly 10 from the socket 40 is performed in substantially the opposite way. The release lever 78 may be lifted upward, pulling the lip 72 out of engagement with the recess 34. The connector assembly 10 may then be pulled out of the socket 40. To release the locking key assembly 50 from within the socket 40, the free end of the adapter key 52, generally the mounting bracket 62 portion of the key, is pressed downward until the tab 58 is released from within the window 44 of the socket keyway 42. The locking key assembly 50 can then be slid out of the socket 40.

III. Alternate Embodiments

Referring to FIGS. 12A-30, alternate embodiments of a connector assembly and adapter key are illustrated. The connector assembly of the alternate embodiments is structurally and functionally similar to the connector assembly 10 of the first embodiment; accordingly, like parts will be identified with like numerals, consecutively increased by 100.

Figure 12A:
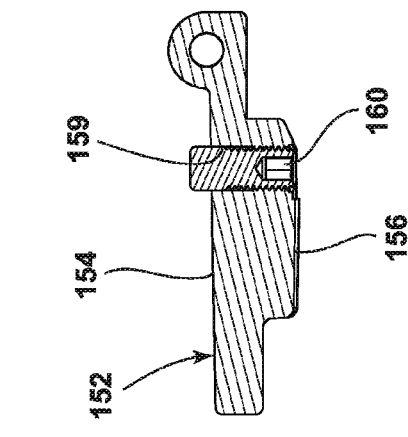
FIG. 12A is a cross-sectional view of a screw lock key of a connector assembly according to another embodiment, illustrating the free state of the screw lock key.
Figure 12B:
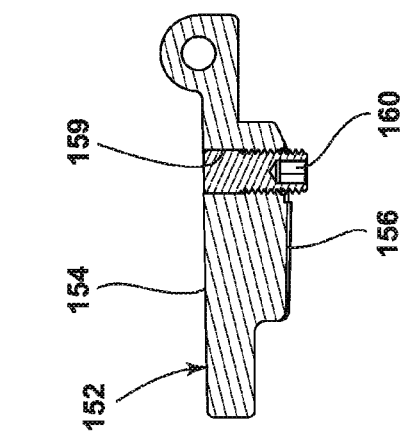
FIG. 12B is a cross-sectional view of the screw lock key, illustrating the constrained state of the screw lock key.
Figure 13:
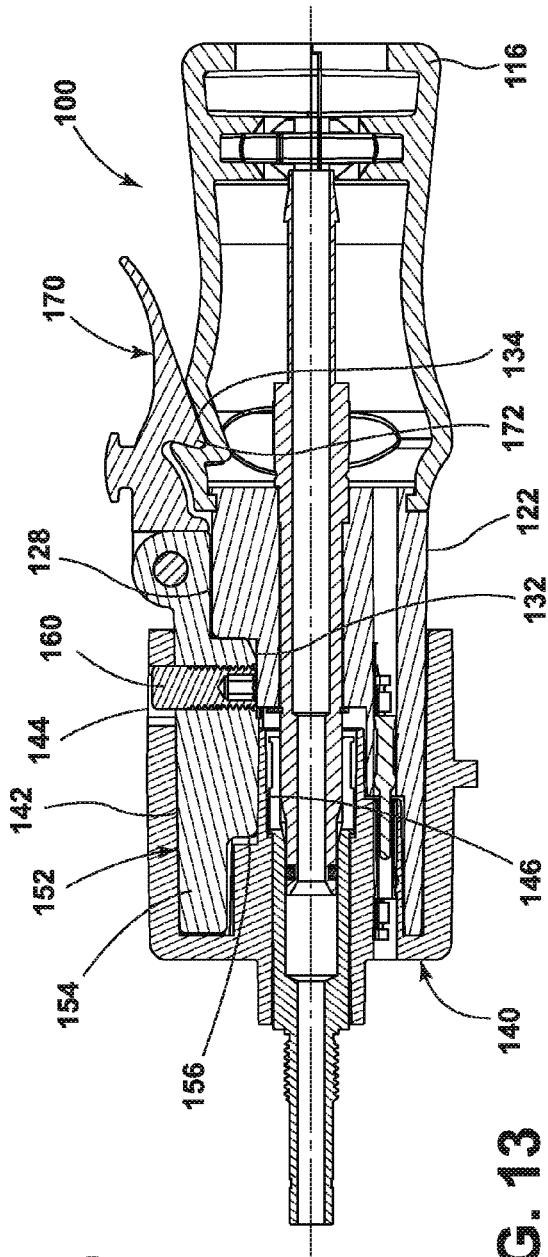
FIG. 13 is a cross-sectional view of the connector assembly inserted into the socket and illustrating the constrained state of the screw lock key.

Referring to FIGS. 12A-13, a second embodiment of a connector assembly 100 is illustrated. The connector assembly 100 utilizes a screw lock key 152 which includes the main body 154 having an integral, lower beam 156 and a threaded bore 159 that extends through the lower beam 156 and main body 154. A threaded post 160 is inserted into the bore 159 and is substantially flush or sub-flush to the upper surface of the main body 154 when in the free state A, shown in FIG. 12A. The screw lock key 152 is inserted into the void 148 in the socket 140 as described above. With the screw lock key 152 inserted, the post 160 is turned using a conventional tool (not shown), raising the post 160 to the constrained state B in which the upper end of the post 160 extends into the keyway window 144 in the socket 140. With the post 160 in the constrained state B, shown in FIGS. 12B and 13, the plug 122 is inserted into the socket 140 and the latch 170 seated within the connector body recess 134 as described above. Removal is performed in substantially the opposite steps.

Figure 14:
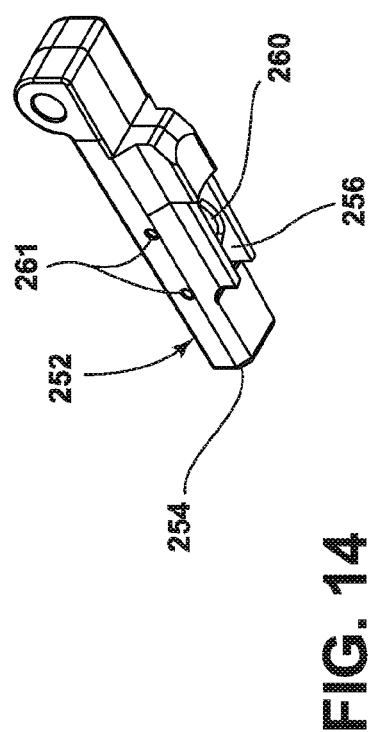
FIG. 14 is a bottom prospective view of a torsion spring key of a connector assembly according to another embodiment.
Figure 15:
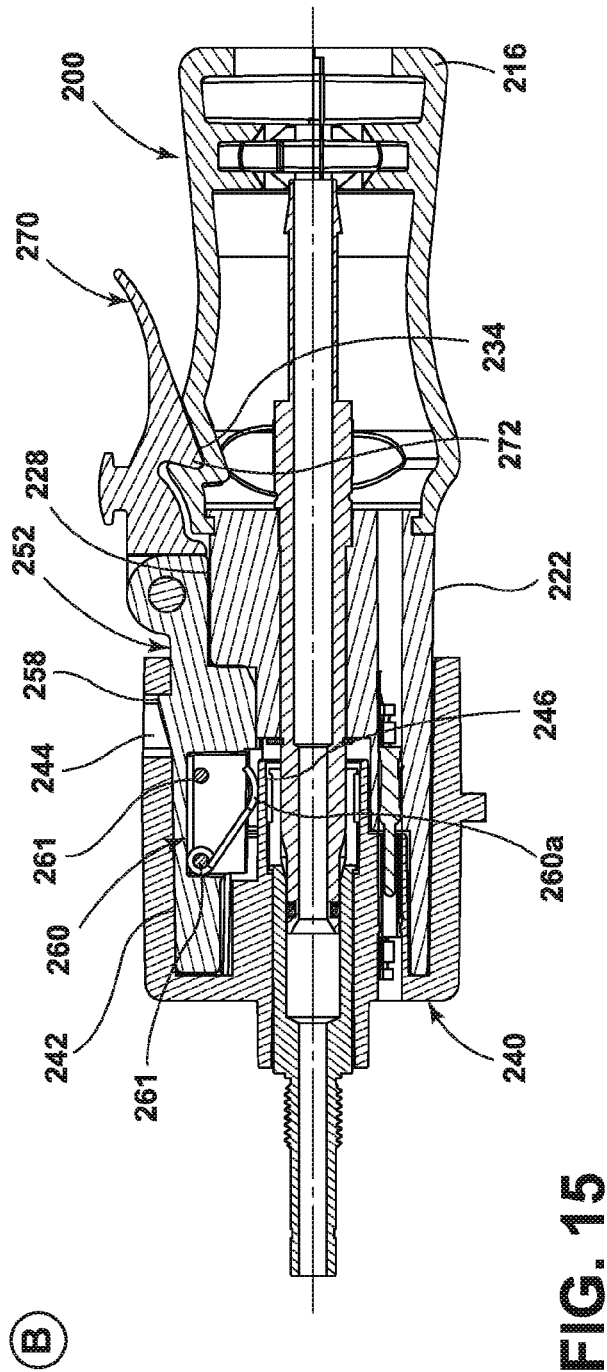
FIG. 15 is a cross-sectional view of the connector assembly inserted into the socket and illustrating the constrained state of the torsion spring key.

Referring to FIGS. 14-15, a third embodiment of a connector assembly 200 is illustrated. The connector assembly 200 includes a torsion spring key 252 which has the main body 254 with a central recess 256 in which a torsion spring 260 is inserted, and tab 258 positioned on the main body 254 opposite the central recess 256. The torsion spring 260 is supported and retained within the central recess 256 by one or more cross pins 261. The torsion spring 260 includes a spring leg 260a that extends below the main body 254 when in the free state A. The torsion spring key 252 is inserted into the void 248 in the socket 240 as described above. With the torsion spring key 252 inserted, spring leg 260a presses against the central channel 246 of the socket 240, biasing the tab 258 into engagement within the keyway window 244 in the socket 240 and into the constrained state B, shown in FIG. 15. With the torsion spring 260 and tab 258 in the constrained state B, the plug 222 is inserted into the socket 240 and the latch 270 seated within the connector body recess 234 as described above. Removal is performed in substantially the opposite steps, including pressing the free end of the adapter key 252, down, and compressing the torsion spring 260 to free the tab 258 from within the keyway window 244.

Figure 16:
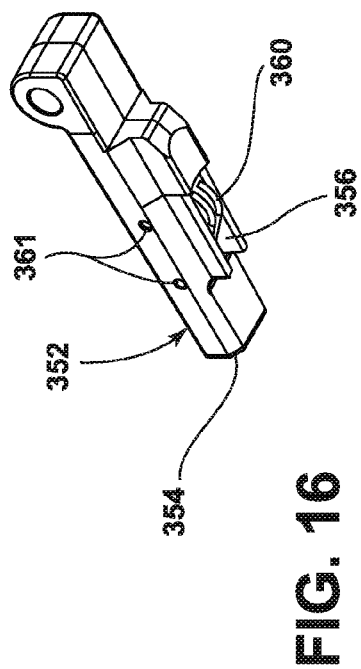
FIG. 16 is a bottom prospective view of a spring clip key of a connector assembly according to another embodiment.
Figure 17:
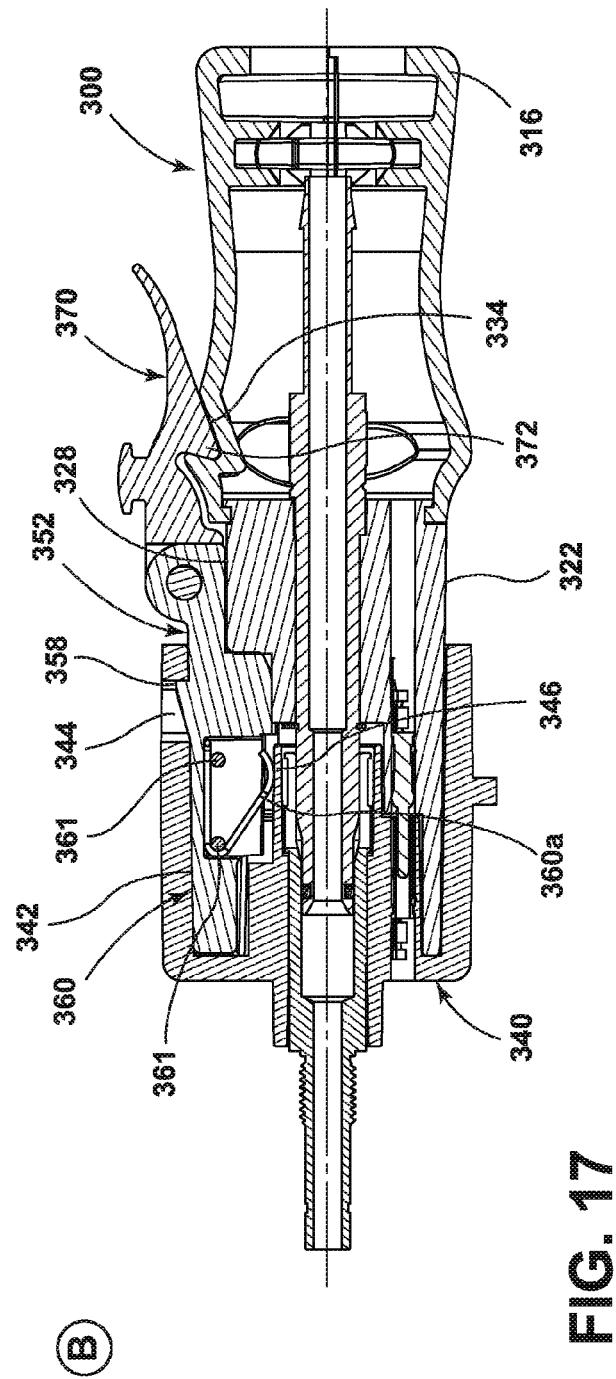
FIG. 17 is a cross-sectional view of the connector assembly inserted into the socket and illustrating the constrained state of the spring clip key.

Referring to FIGS. 16-17, a fourth embodiment of a connector assembly 300 is illustrated. The connector assembly 300 includes a spring clip key 352 which has the main body 354 with a central recess 356 in which a spring clip 360 is inserted, and the tab 358 positioned on the main body 354 opposite the central recess 356. The spring clip 360 is supported and retained within the central recess 356 by one or more cross pins 361. The spring clip 360 includes one or more spring legs 360a that extend below the main body 354 when in the free state A. The spring clip key 352 is inserted into the void 348 in the socket 340 as described above. With the spring clip key 352 inserted, the spring legs 360a press against the central channel 346 of the socket 340, biasing the tab 358 into engagement within the keyway window 344 in the socket 340, and into the constrained state B shown in FIG. 17. With the spring clip 360 and tab 358 in the constrained state B, the plug 322 is inserted into the socket 340 and the latch 370 seated within the connector body recess 334. Removal is performed in substantially the opposite steps, including pressing the free end of the adapter key 352 down, and compressing the spring clip 260 to free the tab 258 from within the keyway window 244.

Figure 18:
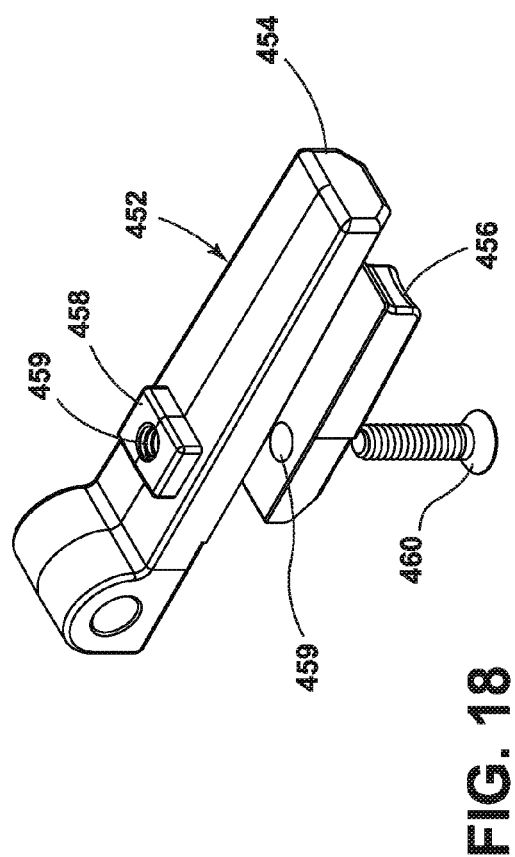
FIG. 18 is a prospective view of a block wedge key of a connector assembly according to another embodiment.
Figure 19:
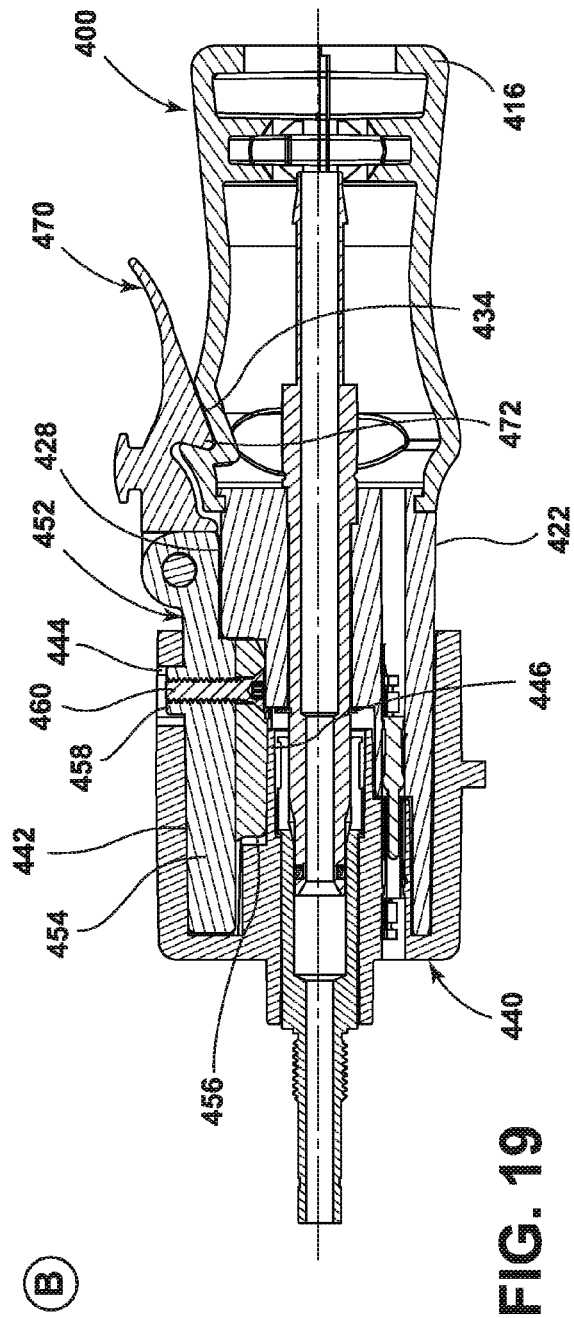
FIG. 19 is a cross-sectional view of the connector assembly inserted into the socket and illustrating the constrained state of the block wedge key.

Referring to FIGS. 18-19, a fifth embodiment of a connector assembly 400 is illustrated. The connector assembly 400 includes a block wedge key 452 which has the main body 454 and a raised catch 458 on an upper surface of the main body 454. The block wedge key 452 also includes an elongated block wedge 456; a threaded bore 459 extends through both the main body 454 and the block wedge 456. To install the block wedge key 452, the main body 454 is inserted into the void 448 in the socket 440, positioning the catch 458 within the keyway window 444. The block wedge 456 is slid into position under the main body 454, aligning the portions of the bore 459. A screw 460 is inserted into the bore 459 and secured using a conventional tool (not shown), locking the block wedge key 452 in the constrained state B shown in FIG. 19. The plug 422 is then inserted into the socket 440 and the latch 470 seated within the connector body recess 434. Removal is performed in substantially the opposite steps.

Figure 20:
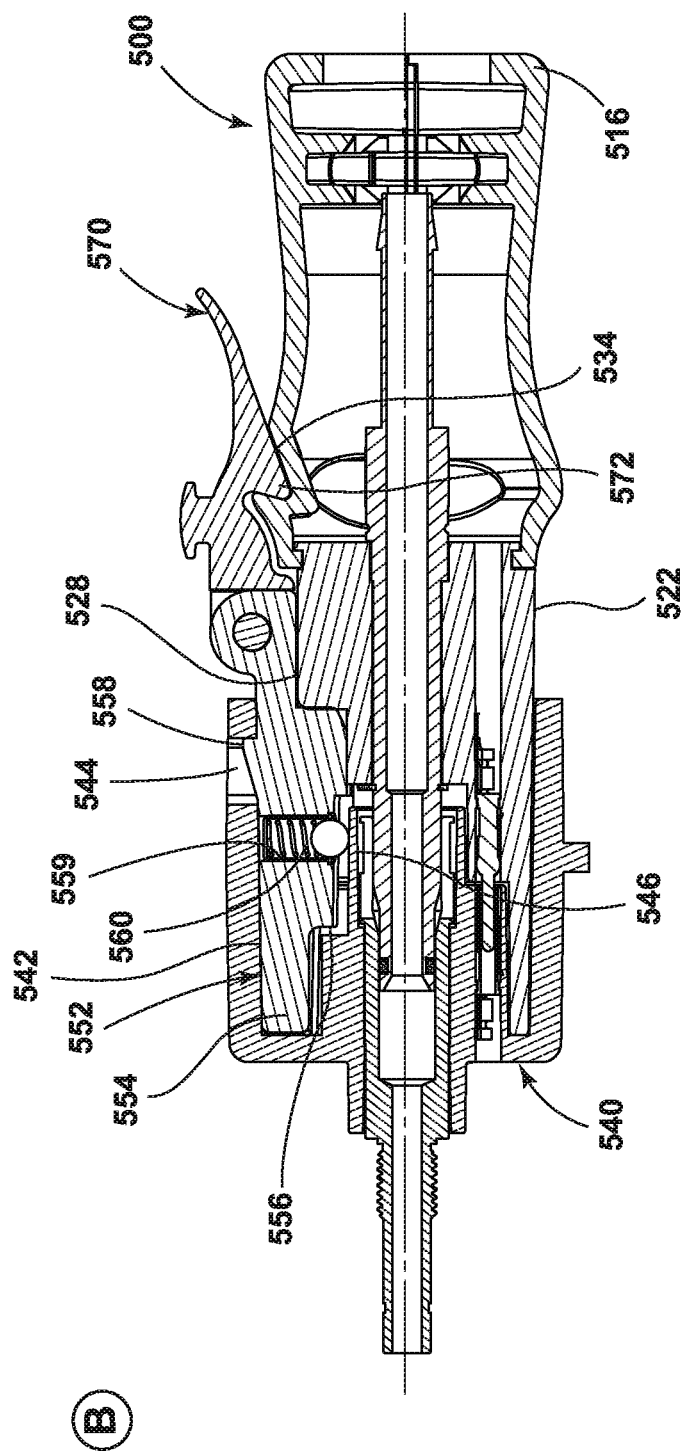
FIG. 20 is a cross-sectional view of a connector assembly including a ball detent key according to another embodiment, the connector assembly inserted into the socket and illustrating the constrained state of the ball detent key.

Referring to FIG. 20, a sixth embodiment of a connector assembly 500 is illustrated. The connector assembly 500 includes a ball detent key 552 which has the main body 554 with an integral lower beam 556, a tab 558, and a bore 559 that extends through the lower beam 556 and main body 554. A spring loaded ball detent 560 is inserted into the bore 559, with the ball protruding slightly below the lower surface of the lower beam 556. The ball detent key 552 is slid into the void 548 in the socket 540 as described above. The ball detent 560 forces the ball detent key 552 up and presses tab 558 into engagement with the keyway window 544 in the socket 540 and into the constrained state B. The plug 522 is inserted into the socket 540 and the latch 570 seated within the connector body recess 534. Removal is performed in substantially the opposite steps, including pressing the free end of the adapter key 552 down to compress the ball detent 560 to free the tab 558 from within the keyway window 544.

Figure 21:
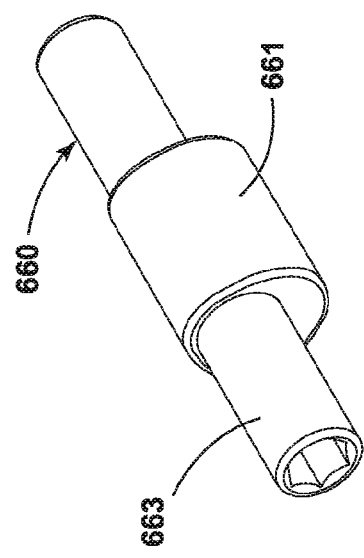
FIG. 21 is a perspective view of a cam key of a connector assembly according to another embodiment.
Figure 22:
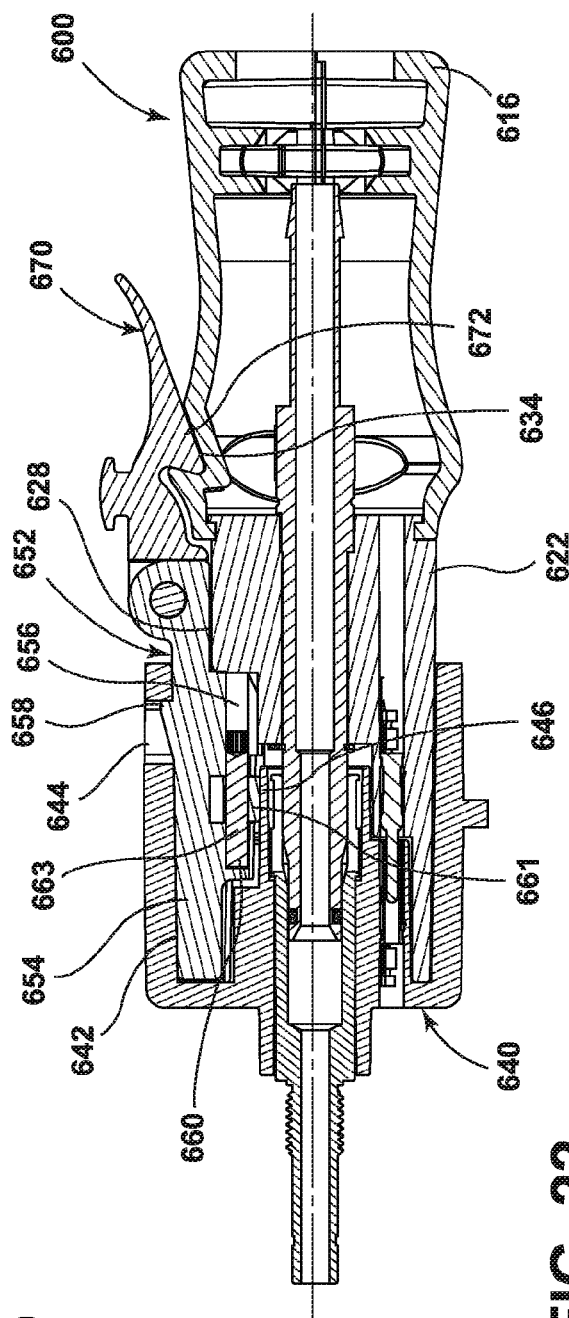
FIG. 22 is a cross-sectional view of the connector assembly inserted into the socket and illustrating the constrained state of the cam key.

Referring to FIGS. 21-22, a seventh embodiment of a connector assembly 600 is illustrated. The connector assembly 600 utilizes a cam key 652 which includes the main body 654 with a central recess 656 in which a cam shaft 660 is inserted, and tab 658 positioned on the main body 654 opposite the central recess 656. The cam shaft 660 includes a lobed portion 661 and a shaft 663. The cam shaft 660 is oriented such that lobed portion 661 is substantially flush or sub-flush to the lower surface of the main body 654 when in the free state A. The cam key 652 is inserted into the void 648 in the socket 640 as described above. With the cam key 652 inserted, the shaft 663 is turned using a conventional tool (not shown), rotating the lobed portion 661 into engagement with the socket central channel 646 and raising the cam key 652 up and pressing the tab 658 into engagement with the keyway window 644 in the socket 640 and into the constrained state B shown in FIG. 22. The plug 622 is inserted into the socket 640 and the latch 670 seated within the connector body recess 634 as described above. Removal is performed in substantially the opposite steps.

Figure 23:
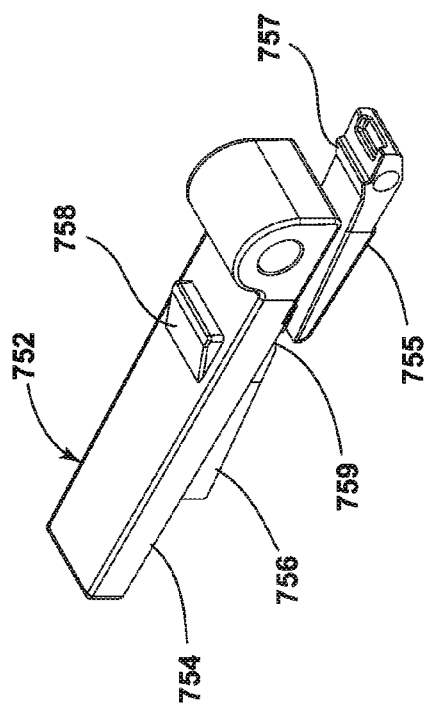
FIG. 23 is a perspective view of a tapered wedge key of a connector assembly according to another embodiment.
Figure 24:
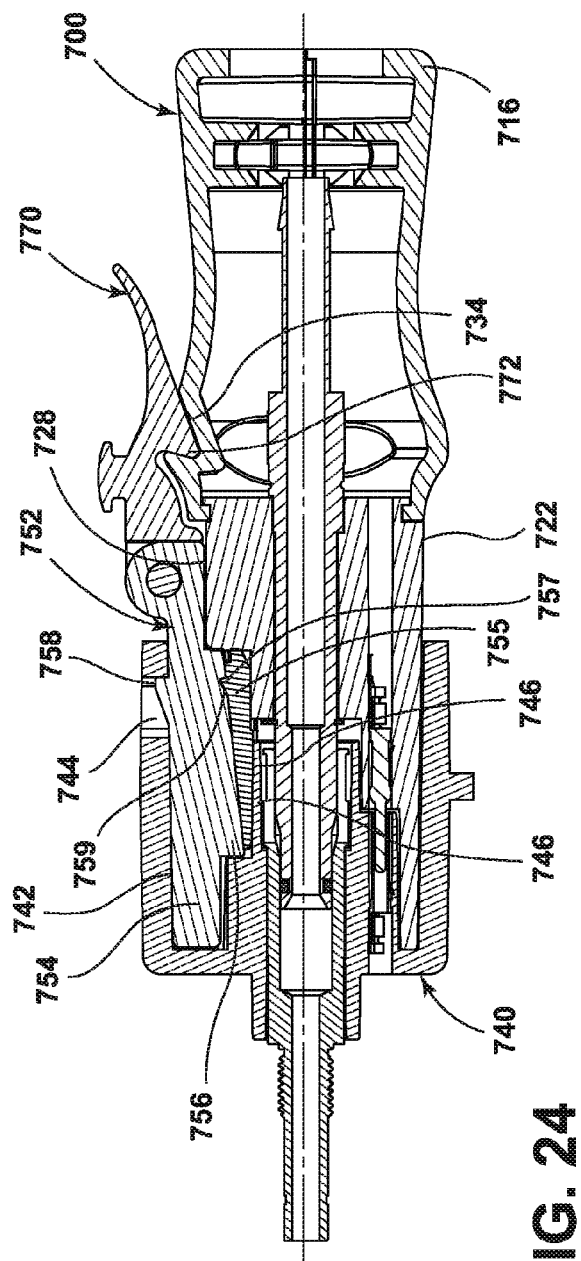
FIG. 24 is a cross-sectional view of the connector assembly inserted into the socket and illustrating the constrained state of the tapered wedge key.

Referring to FIGS. 23-24, an eighth embodiment of a connector assembly 700 is illustrated. The connector assembly 700 includes a tapered wedge key 752 which has a main body 754, a sloped lower beam 756, and a tab 758 on an upper surface of the main body 754. The tapered wedge key 752 also includes a tapered wedge 755. The tapered wedge 755 has a lip 757 on the upper surface thereof that snaps into a complementary tapered notch 759 formed in the lower surface of the sloped lower beam 756. To install the tapered wedge key 752, the main body 754 is inserted into the void 748 in the socket 740, positioning the tab 748 within the keyway window 744. The tapered wedge 755 is slid into position under the lower beam 756 until the lip 757 snaps into the notch 759, pressing the tapered wedge key 752 and tab 748 in the constrained state B shown in FIG. 24. The plug 722 is then inserted into the socket 740 and the latch 770 seated within the connector body recess 734. Removal is performed in substantially the opposite steps, including using a prying tool (not shown) to pry the tapered wedge 755 out from engagement with the main body 754.

Figure 25:
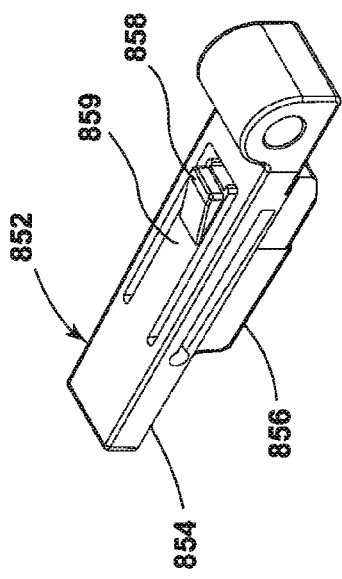
FIG. 25 is a perspective view of a cantilevered tab key of a connector assembly according to another embodiment.
Figure 26:
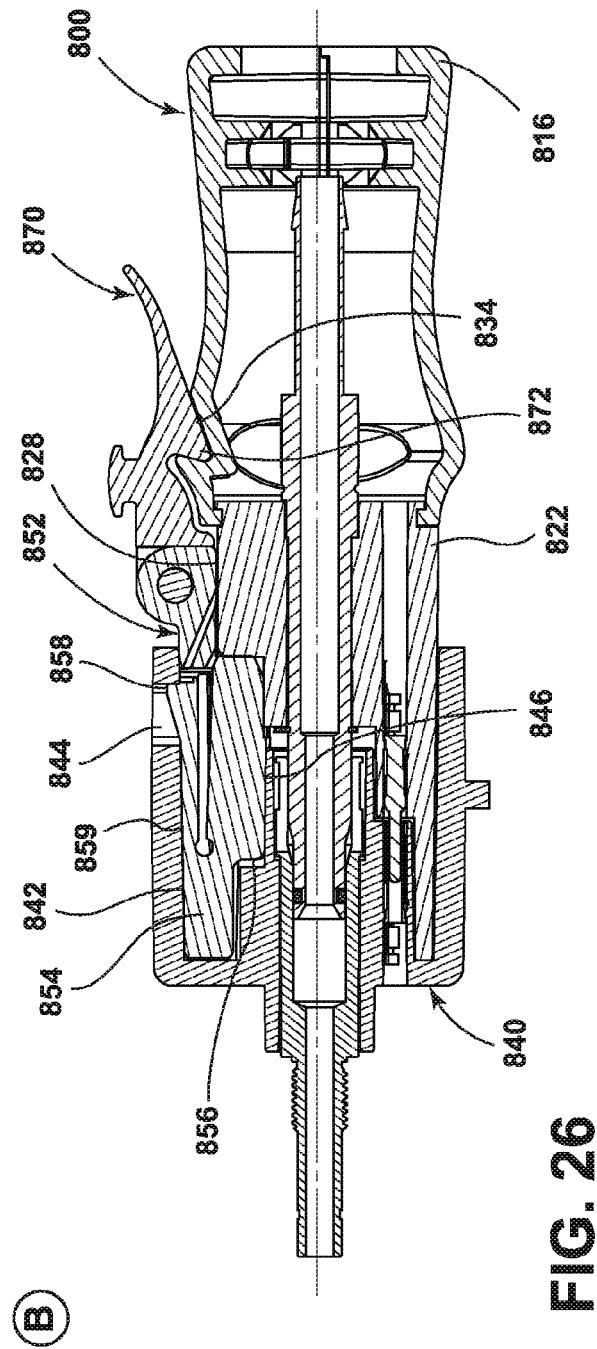
FIG. 26 is a cross-sectional view of the connector assembly inserted into the socket and illustrating the constrained state of cantilevered tab key.

Referring to FIGS. 25-26, a ninth embodiment of a connector assembly 800 is illustrated. The connector assembly 800 includes a cantilevered tab key 852 which has the main body 854, an integral, lower beam 856, and a cantilevered tab 858. The cantilevered tab 858 is integrally formed in the upper surface of the main body 854 and is connected thereto by a cantilever arm 859. The cantilever tab key 852 is slid into the void 848 in the socket 840 as described above, depressing the cantilever arm 859 and tab 858 until the tab 858 is free to move back up, into engagement with the keyway window 844 in the socket 840 and into the constrained state B shown in FIG. 26. The plug 822 is inserted into the socket 840 and the latch 870 seated within the connector body recess 834. Removal is performed in substantially the opposite steps, including using a conventional tool (not shown) to depress the cantilevered tab 858 down and releasing the cantilever tab key 852.

Referring to FIGS. 27-28, a tenth embodiment of a connector assembly 900 is illustrated. The connector assembly 900 includes a cantilever screw key 952 which has the main body 954, an integral, lower beam 956, and a cantilevered tab 958. The cantilevered tab 958 is integrally formed in the upper surface of the main body 954 and is connected thereto by a cantilever arm 961 and is designed to be flush or sub-flush with the upper surface of the main body 954 when in the free state A. Further, a threaded bore 959 extends through the lower beam 956 and a screw 960 is inserted into the bore 959. The cantilever screw key 952 is slid into the void 948 in the socket 940 as described above, aligning the tab 958 with the keyway window 944 in the socket 940. With the tab 958 aligned, the screw 960 is turned using a conventional tool (not shown), raising the screw 960 until it contacts the lower surface of the cantilever arm 961, subsequently raising the tab 958 into engagement with the keyway window 944 in the socket 940, into the constrained state B shown in FIG. 28. The plug 922 is inserted into the socket 940 and the latch 970 seated within the connector body recess 934. Removal is performed in substantially the opposite steps, including using a conventional tool (not shown) to lower the screw 960, releasing the tab 958 from within the window 944.

Figure 29:
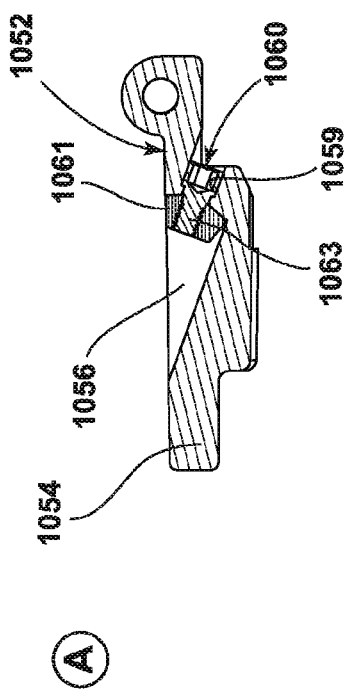
FIG. 29 is a cross-sectional view of a cam screw key of a connector assembly according to another embodiment.
Figure 30:
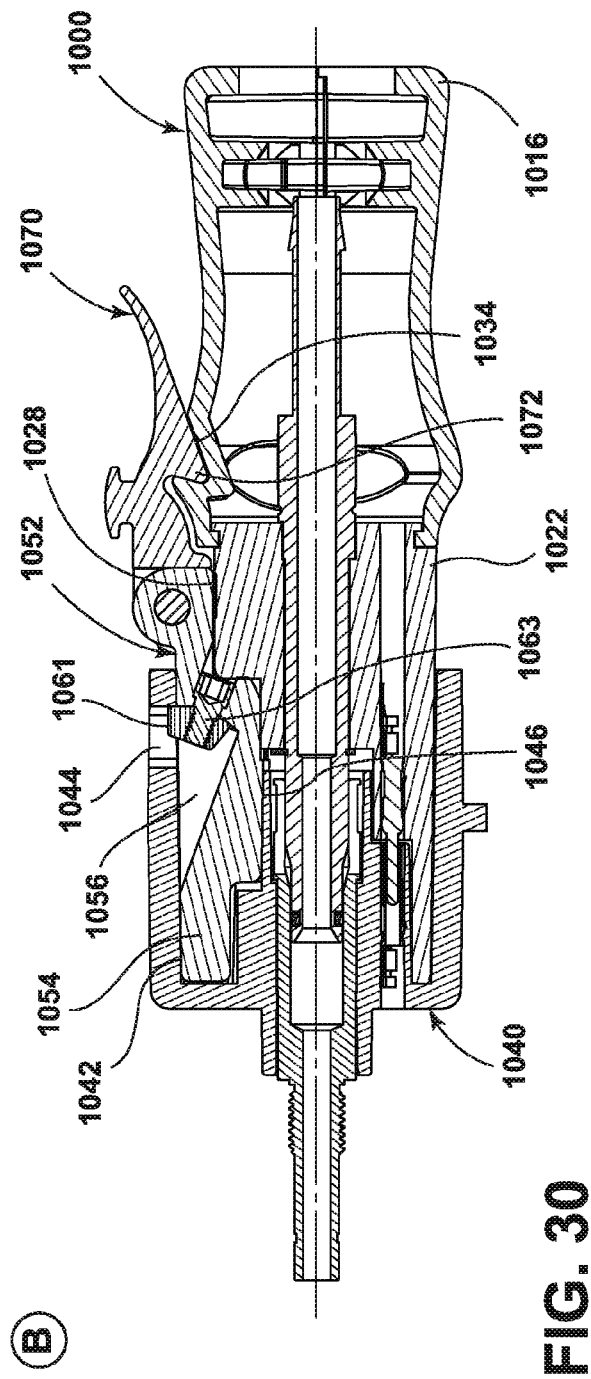
FIG. 30 is a cross-sectional view of the connector assembly inserted into the socket and illustrating the constrained state of cam screw cam key.

Referring to FIGS. 29-30, an eleventh embodiment of a connector assembly 1000 is illustrated. The connector assembly 1000 includes a cam screw key 1052 which has the main body 1054 having an upper central recess 1056 and a bore 1059 in which a cam catch 1060 is installed. The cam catch 1060 includes a lobed head 1061 and a shaft 1063. The cam catch 1060 is oriented such that lobed head 1061 is substantially flush or sub-flush within the central recess 1056 when in the free state A. The cam screw key 1052 is inserted into the void 1048 in the socket 1040 as described above. With the cam screw key 1052 inserted, the shaft 1063 is turned using a conventional tool (not shown), rotating the lobed head 1061 into engagement with the keyway window 1044 in the socket 1040, into the constrained state B shown in FIG. 30. The plug 1022 is inserted into the socket 1040 and the latch 1070 seated within the connector body recess 1034 as described above. Removal is performed in substantially the opposite steps.

Referring to FIGS. 31-36, alternate embodiments of a connector assembly and latch are illustrated. The connector assembly of the alternate embodiments is structurally and functionally similar to the connector assembly 10 of the first embodiment.

Figure 31:
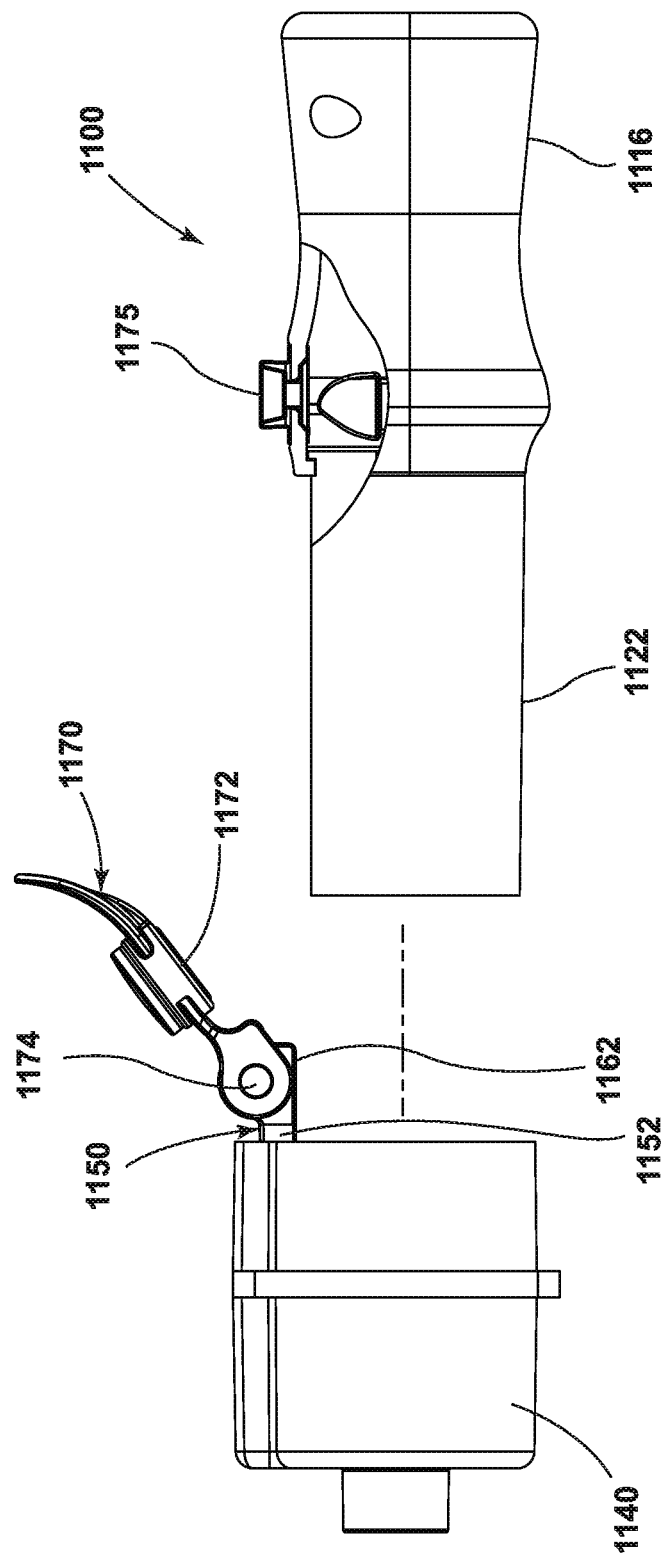
FIG. 31 is a side view of a snap latch of the connector assembly according to another embodiment.

Referring to FIG. 31, a twelfth embodiment of a connector assembly 1100 is illustrated. The connector assembly 1100 includes a snap latch 1170 which has a female snap 1172 for releasably retaining the latch 1170 to a complementary male snap 1175 affixed to the connector body 1116. The latch 1170 is pivotally mounted to the mounting bracket 1162 on the adapter key 1152 by a hinge pin 1174. With the adapter key 1152 and plug 1122 inserted into the socket 1140, the snap latch 1170 releasably retains the locking key assembly 1150 to the connector body 1116.

Figure 32:
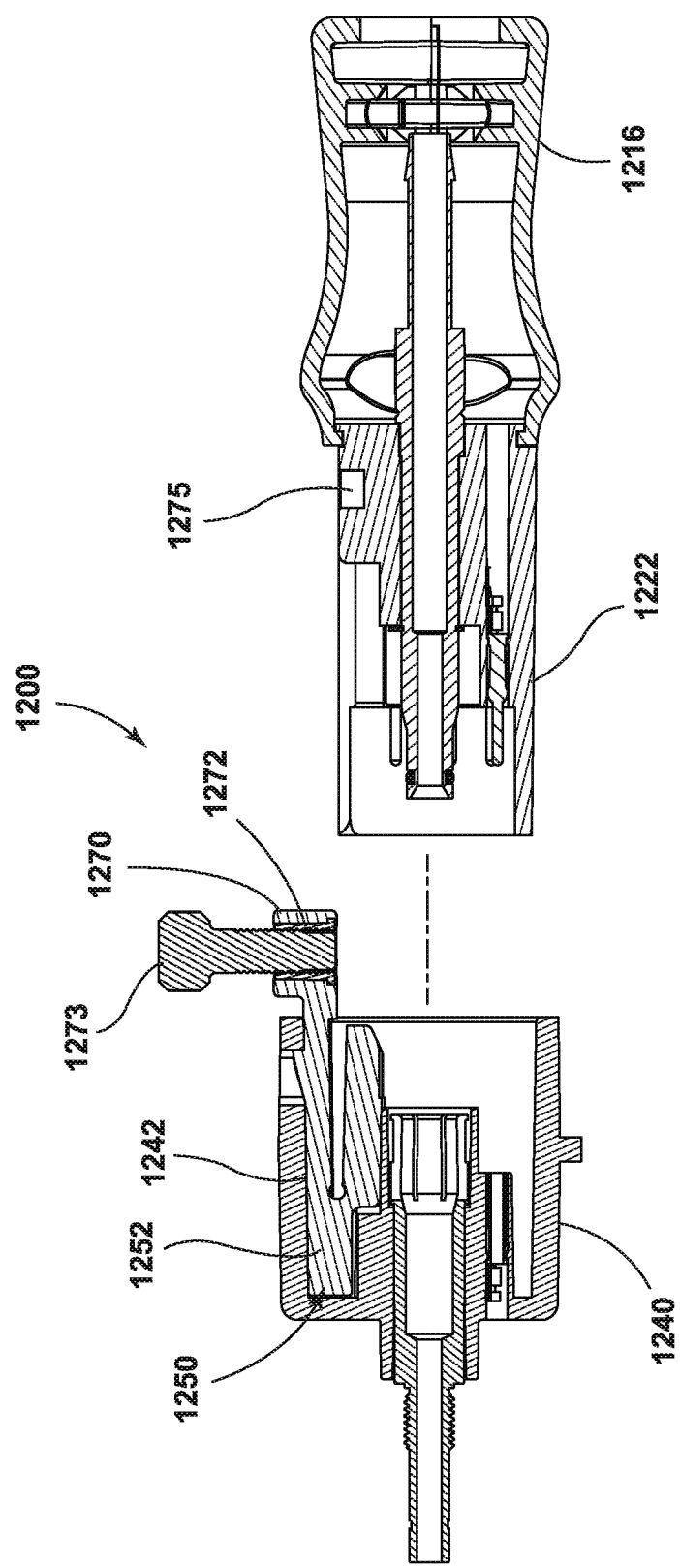
FIG. 32 is a cross-sectional view of a fixed latch of the connector assembly according to another embodiment.

Referring to FIG. 32, a thirteenth embodiment of a connector assembly 1200 is illustrated. The connector assembly 1200 includes a fixed latch 1270 that is integral to the adapter key 1252 and does not pivot. The fixed latch 1270 includes a threaded channel 1272 in which a complementary threaded fastener 1273 is threadably affixed. The plug 1222 includes a bore 1275 that receives the fastener 1273 when the plug 1222 is inserted into the socket 1240. Accordingly, with the adapter key 1252 and plug 1222 inserted into the socket 1240, the fixed latch 1270 releasably retains the locking key assembly 1250 to the plug 1222.

Figure 33:
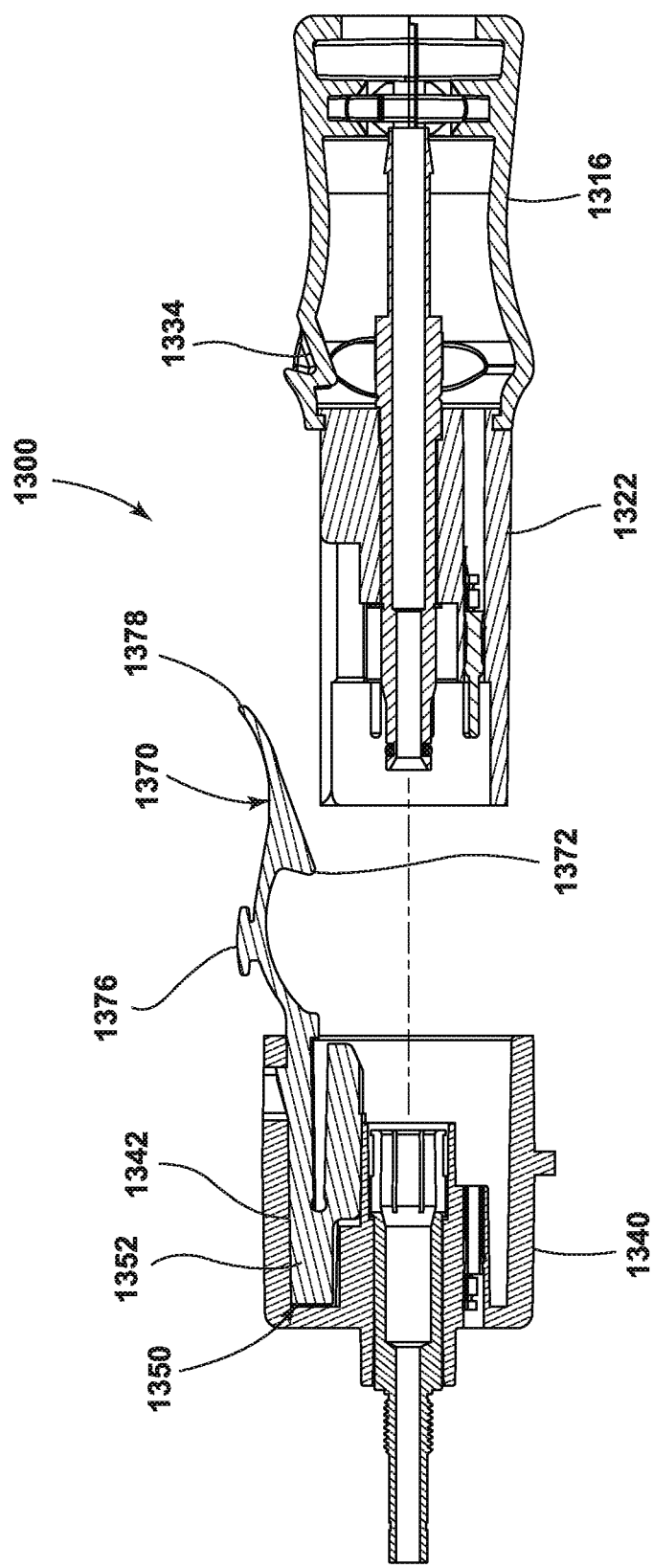
FIG. 33 is a cross-sectional view of a flexible latch of the connector assembly according to another embodiment.

Referring to FIG. 33, a fourteenth embodiment of a connector assembly 1300 is illustrated. The connector assembly 1300 includes a flexible latch 1370 that is integral to the adapter key 1352 and includes a button 1376 and a release lever 1378. The latch 1370 also includes a lip 1372, for releasably retaining the latch 1370 to the complementary tapered recess 1334 on the connector body 1316. The latch 1370 is integral to the adapter key 1352, but flexes to substantially follow the contour of the connector body 1316. The button 1376 is pressed down, seating the lip 1372 within the tapered recess 1334 of the connector body 1316. Accordingly, with the adapter key 1352 and plug 1322 inserted into the socket 1340, the flexible latch 1370 retains the locking key assembly 1350 to the connector body 1316. To disengage the lip 1372 from the recess 1334, the release lever 1378 may be lifted upward, pulling the lip 1372 out of engagement with the recess 1334.

Figure 34:
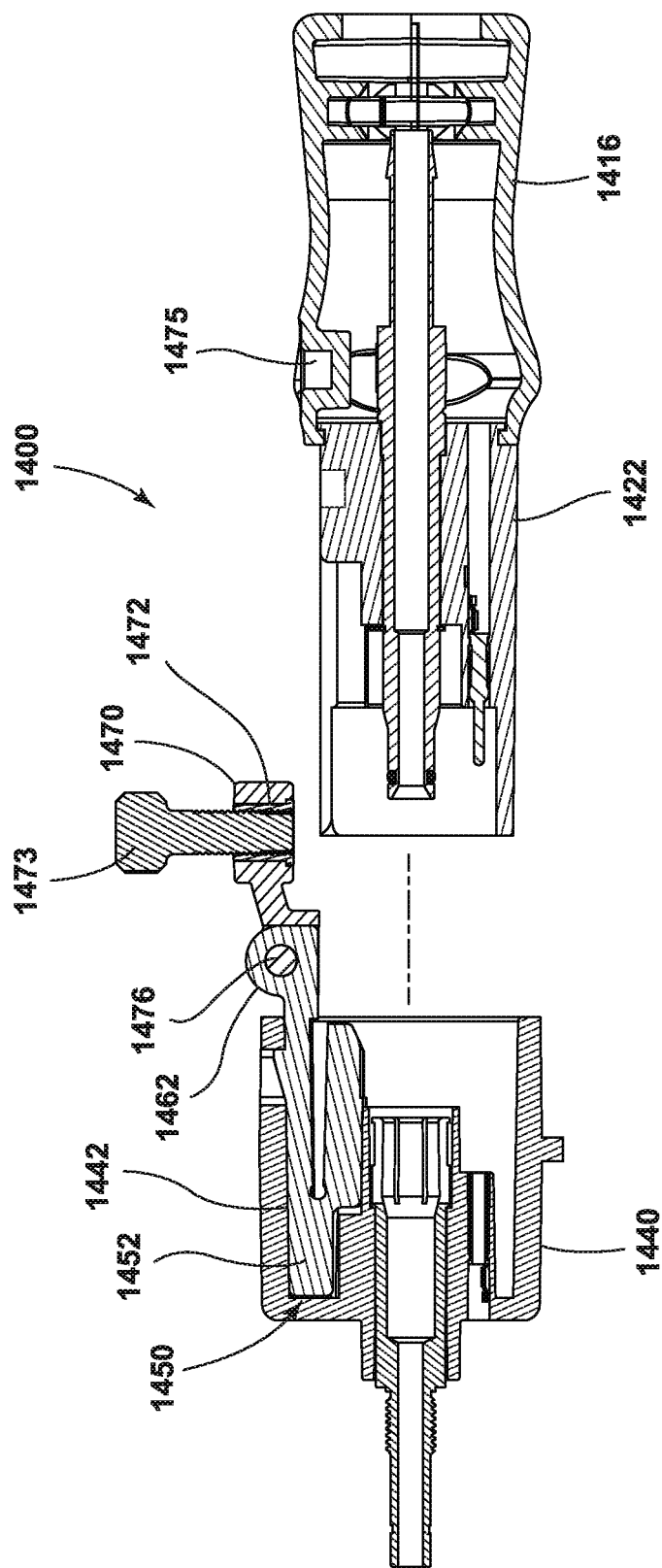
FIG. 34 is a cross-sectional view of a pivot latch of the connector assembly according to another embodiment.

Referring to FIG. 34, a fifteenth embodiment of a connector assembly 1400 is illustrated. The connector assembly 1400 includes a pivot latch 1470 that has a threaded channel 1472 in which a complementary threaded fastener 1473 is threadably affixed. The latch 1470 is pivotally mounted to the mounting bracket 1462 on the adapter key 1452 by a hinge pin 1476. The plug 1422 includes a bore 1475 that receives the fastener 1473 when the plug 1422 is inserted into the socket 1440. Accordingly, with the adapter key 1452 and plug 1422 inserted into the socket 1440, the pivot latch 1470 releasably retains the locking key assembly 1450 to the plug 1422.

Figure 35:
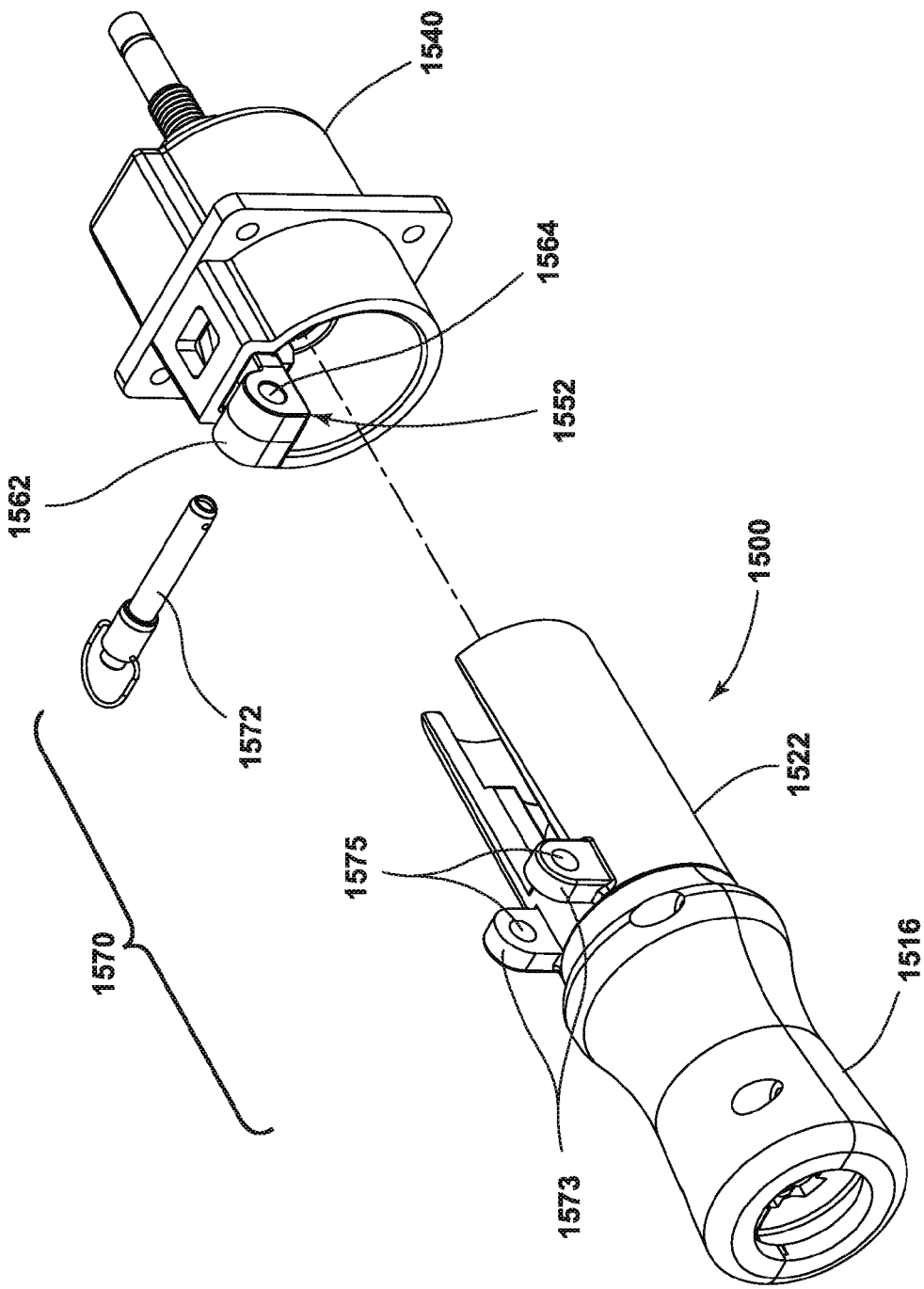
FIG. 35 is a perspective view of a lock pin latch of the connector assembly according to another embodiment.

Referring to FIG. 35, a sixteenth embodiment of a connector assembly 1500 is illustrated. The connector assembly 1500 includes a lock pin latch 1570 that includes a lock pin 1572 (pip pin, clevis pin, etc.) and a set of bracket ears 1573 formed on the plug 1522; the bracket ears 1573 include aligned pin holes 1575. When the plug 1522 is inserted into the socket 1540, the bracket ears 1573 align with the mounting bracket 1562 on the adapter key 1552. The lock pin 1572 may be inserted through the pin holes 1564, 1575. Accordingly, with the adapter key 1552 and plug 1522 inserted into the socket 1540, the lock pin latch 1570 releasably retains the locking key assembly 1550 to the plug 1522 and connector body 1516. Alternatively, a threaded fastener, such as a thumb screw, could be used to retain the locking key assembly to the plug and connector body. At least one of the pin holes 1564, 1575 could be threaded to threadably affix the fastener within the bracket ears 1573 and mounting bracket 1562.

Figure 36:
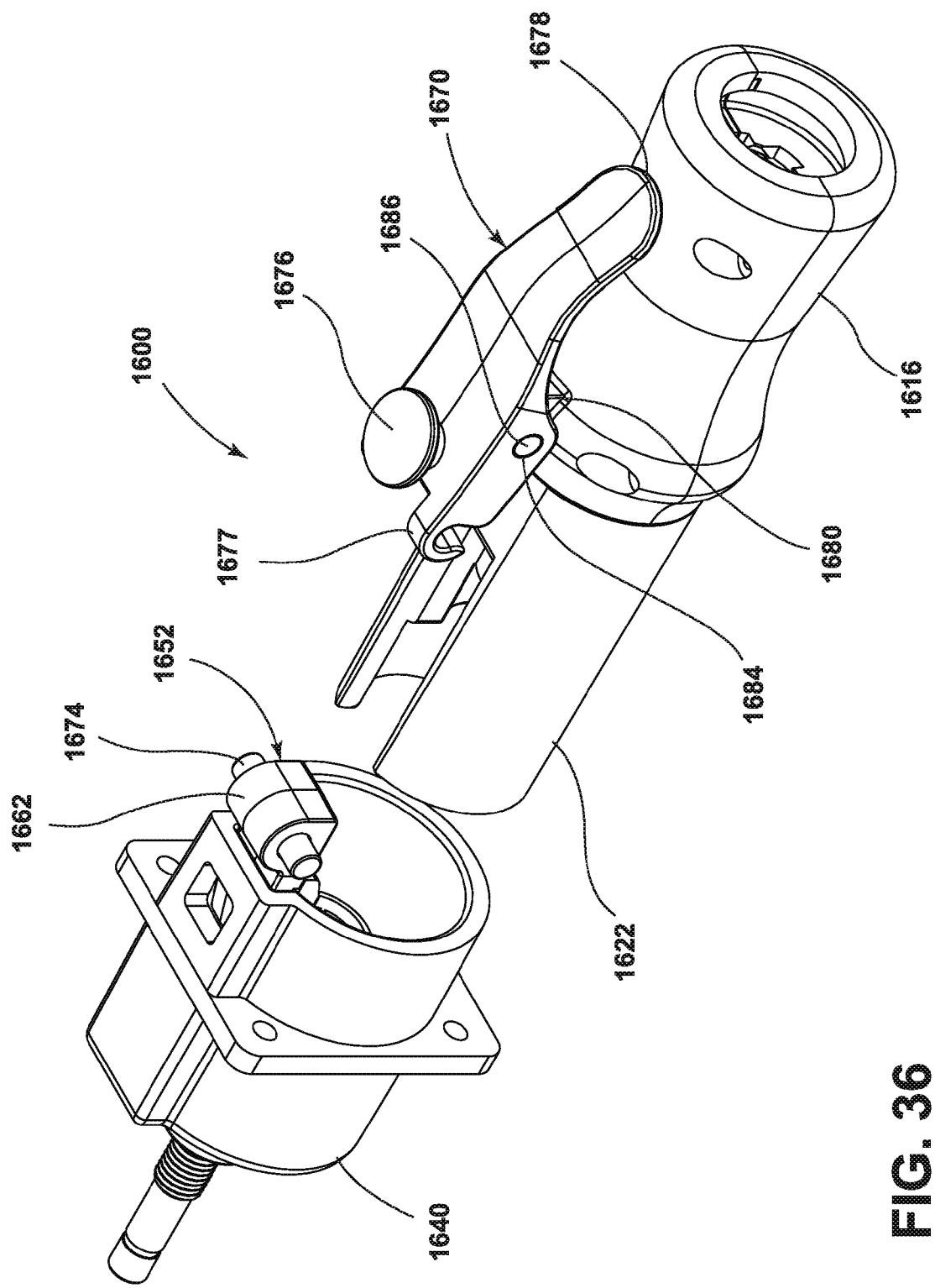
FIG. 36 is a perspective view of a pivot hook latch of the connector assembly according to another embodiment.

Referring to FIG. 36, a seventeenth embodiment of a connector assembly 1600 is illustrated. The connector assembly 1600 includes a pivot hook latch 1670 that has a button 1676, a release lever 1678, and spaced hook arms 1677. The connector body 1616 includes a mounting block 1680 with a hole 1682 (not shown) therethrough, and the pivot hook latch 1670 also includes through holes 1684, which align with the mounting block hole 1682. A pivot pin 1686 extends through the aligned holes 1682, 1684 such that the pivot hook latch 1670 is pivotally mounted to connector body 1616. Further, a fixed pin 1674 extends out from the mounting bracket 1662 of the key 1652. The button 1676 on the pivot hook latch 1670 is pressed (and pivoted) down to hook the spaced hook arms 1677 over the fixed pin 1674. The hook arms 1677 and pin 1674 may be sized such that the hook arms 1677 are press-fit over the pin 1674. Accordingly, with the adapter key 1652 and plug 1622 inserted into the socket 1640, the pivot hook latch 1670 retains the locking key assembly 1650 to the connector body 1616.

The arrangement and/or combination of the components set forth in the above description and illustrated in the drawings should not be regarded as limiting. It should be understood by one skilled in the art that many combinations of the disclosed adapter keys and latches may be made to form a desired connector assembly. The connector assembly may include an adapter key in the form of: a screw lock key, a torsion spring key, a spring clip key, a block wedge key, a ball detent key, a cam key, a tapered wedge key, a cantilevered tab key, a cantilever screw key, and a cam screw key. The connector assembly may include a latch in the form of: a snap latch, a fixed latch, a flexible latch, a pivot latch, a lock pin latch, and a pivot hook latch. All feasible combinations of adapter keys and latches are contemplated herein.

Any reference to elements in the singular, for example, using the articles "a," "an," "the," or "said," is not to be construed as limiting the element to the singular. Throughout this description, directional terms, such as "upper", "lower", "inner", "outer", "front", and "rear", are used based on the orientation of the embodiment shown in the drawings. The use of directional terms does not limit the embodiment or the invention to any specific orientation(s).

The above description is that of a current embodiment of the invention. Various alterations and changes can be made without departing from the spirit and broader aspects of the invention as defined in the appended claims, which are to be interpreted in accordance with the principles of patent law including the doctrine of equivalents.

The invention claimed is:

1. A connection system for releasably coupling a plasma arc torch lead to a power supply receiver having a radially extending female keyway, the connection system comprising:
   a connector assembly comprising:
      a connector body having a distal end and a proximal end, the distal end configured to connect to the plasma arc torch lead; and
      a plug secured within and extending from the proximal end of the connector body, the plug configured to be inserted into the power supply receiver, the plug defining a longitudinally oriented female keyseat; and
   a locking key assembly including:
      an adapter key configured to connect to the power supply receiver and including a first male portion configured to extend into the power supply receiver keyway, the adapter key including a longitudinally oriented second male portion configured to interfit with the plug female keyseat when the plug is inserted into the power supply receiver; and
      a latch movably connected to the adapter key and configured to releasably engage the connector body to releasably lock the plug within the power supply receiver.

2. The connection system according to claim 1 wherein the adapter key includes a detent finger and a tab opposite the detent finger, wherein the tab is configured for receipt within a window formed in the power supply receiver keyway.

3. The connection system according to claim 2 wherein the detent finger is movable between a free state and a constrained state.

4. The connection system according to claim 3 wherein the tab is restrained within the window of the keyway when the plug is inserted into the power supply receiver.

5. The connection system according to claim 2 wherein the locking key assembly includes a mounting bracket and the latch is pivotally mounted to the mounting bracket with a hinge pin.

6. The connection system according to claim 2 wherein the latch includes a retention feature for retaining the latch to the connector body, and the connector body includes a complementary receiving feature.

7. The connection system according to claim 6 wherein the retention feature is one of a lip, a snap, a pin, and a screw.

8. A torch connection system for coupling a plasma arc torch lead and a power supply receiver having a radially extending female keyway, the torch connection system comprising:
 a connector assembly including a connector body and a plug, the connector body having a distal end and a proximal end, the distal end configured to connect to the plasma arc torch lead, the plug secured within and extending from the proximal end of the connector body the plug defining a longitudinally oriented female keyseat, the plug configured for receipt within the power supply receiver; and
 a locking key assembly including an adapter key and a latch, the adapter key including a first male portion configured to extend into and engage the power supply receiver female keyway, the adapter key including a second male portion configured to interfit with the plug female keyseat when the plug is inserted into the power supply receiver, the latch movably connected to the adapter key and configured to releasably engage the connector body to releasably lock the plug within the power supply receiver.

9. The torch connection system according to claim 8 wherein the adapter key is configured to connect to the power supply receiver and includes a tab, the tab biased into engagement within a window formed in the power supply receiver keyway.

10. The torch connection system according to claim 9 wherein the tab is biased by one of a screw-pin, a spring, a clip, a detent finger, a wedge, a ball detent, a cam, and a living hinge.

11. The torch connection system according to claim 9 wherein the tab is restrained within the keyway window when the plug is inserted into the power supply receiver.

12. The torch connection system according to claim 8 wherein the latch includes a retention feature for releasably engaging the latch to the connector body, and the connector body includes a complementary receiving feature.

13. The torch connection system according to claim 12 wherein the retention feature is one of a lip, a snap, a pin, and a screw.

14. A method of connecting a plasma arc torch lead to a power supply, the method comprising:
 providing a power supply including a receiver disposed within or on the power supply, the power supply receiver including a radially extending female keyway with a window formed therethrough;
 inserting a locking key assembly into the power supply receiver keyway, the locking key assembly including an adapter key including a tab and a male portion configured to extend into the power supply receiver female keyway, the locking key assembly including a latch movably connected to the adapter key, the tab biased into engagement within the power supply receiver keyway window;
 providing a connector assembly connected to a plasma arc torch lead, the connector assembly having a connector body and a plug defining a longitudinally oriented female keyseat;
 inserting the connector assembly into the power supply receiver such that the locking key assembly is interfit within the plug keyseat; and
 releasably engaging the locking key assembly latch to the connector body to releasably lock the plug within the power supply receiver.

15. The method according to claim 14 wherein the adapter key tab is biased by one of a screw-pin, a spring, a clip, a detent finger, a wedge, a ball detent, a cam, and a living hinge.

16. The method according to claim 15 wherein the tab is restrained within the power supply receiver keyway window when the plug is inserted into the power supply receiver.

17. The method according to claim 14 wherein the latch includes a retention feature and the connector body includes a complementary receiving feature, wherein the retention feature is one of a lip, a snap, a pin, and a screw.

18. The method according to claim 17 including releasing the locking key assembly latch from the complementary receiving feature on the connector body and removing the connector assembly from the power supply receiver.

19. The method according to claim 18 including moving the tab out of engagement with the power supply receiver keyway window and removing the locking key assembly from within the power supply receiver.

20. The method according to claim 14 wherein adapter key aligns and joins the power supply receiver socket keyway and plug keyseat.

* * * * *